(12) United States Patent
Amano

(10) Patent No.: US 9,288,328 B2
(45) Date of Patent: Mar. 15, 2016

(54) COMMUNICATION TERMINAL AND NON-TRANSITORY COMPUTER READABLE MEDIUM STORING PROGRAM

(71) Applicant: Katsuhiro Amano, Toyota (JP)

(72) Inventor: Katsuhiro Amano, Toyota (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/225,177

(22) Filed: Mar. 25, 2014

(65) Prior Publication Data

US 2014/0295780 A1    Oct. 2, 2014

(30) Foreign Application Priority Data

Mar. 28, 2013    (JP) .................. 2013-068554

(51) Int. Cl.

| | |
|---|---|
| H04M 3/42 | (2006.01) |
| H04M 3/56 | (2006.01) |
| H04L 12/851 | (2013.01) |
| H04L 12/18 | (2006.01) |
| H04W 4/00 | (2009.01) |
| H04W 48/06 | (2009.01) |
| H04M 1/725 | (2006.01) |
| H04W 88/06 | (2009.01) |

(52) U.S. Cl.
CPC .............. H04M 3/56 (2013.01); H04L 12/1818 (2013.01); H04L 47/24 (2013.01); H04W 4/00 (2013.01); H04W 48/06 (2013.01); H04W 88/06 (2013.01)

(58) Field of Classification Search
CPC ... H04M 5/56; H04M 3/567; H04M 2250/62; H04N 7/15

USPC .......... 455/416, 552.1, 553.1; 370/260–261; 379/202.01–207.01
See application file for complete search history.

(56) References Cited

U.S. PATENT DOCUMENTS

| | | | |
|---|---|---|---|
| 2004/0009751 A1* | 1/2004 | Michaelis et al. | 455/62 |
| 2010/0309847 A1* | 12/2010 | Bharadwaj | 370/328 |
| 2012/0069132 A1 | 3/2012 | Kato | |

FOREIGN PATENT DOCUMENTS

| | | |
|---|---|---|
| JP | 2004248127 A | 9/2004 |
| JP | 2012085269 A | 4/2012 |

* cited by examiner

*Primary Examiner* — Lee Nguyen
(74) *Attorney, Agent, or Firm* — Banner & Witcoff, Ltd.

(57) ABSTRACT

A non-transitory computer-readable medium stores computer readable instructions, when executed by a processor of a communication terminal, perform processes including a first obtaining operation, a second obtaining operation, a first storing operation, a third obtaining operation, a second storing operation, and a communicating operation. The first obtaining operation obtains identification information of wireless modules provided in the communication terminal. The second obtaining operation obtains a transmission channel capacity and/or a delay time for the wireless modules. The first storing operation stores the transmission channel capacities and/or the delay time in association with the identification information of the wireless modules. The third obtaining operation obtains data type information corresponding to plural types of communication data in a remote conference. The second storing operation stores the data type information in association with the identification information. The communicating operation communicates with the server using the wireless module referenced by the identification information.

10 Claims, 10 Drawing Sheets

Fig. 1
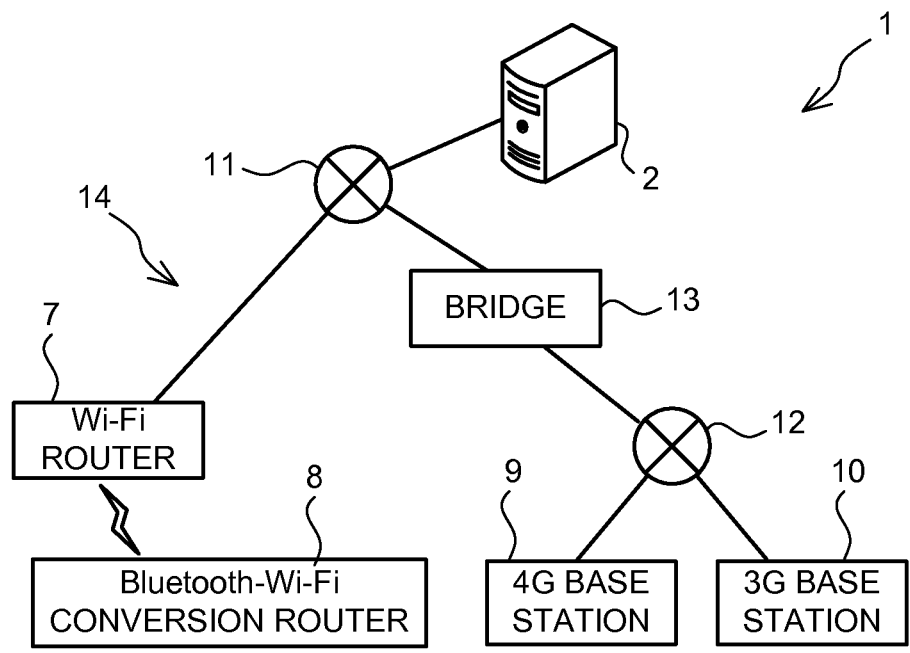
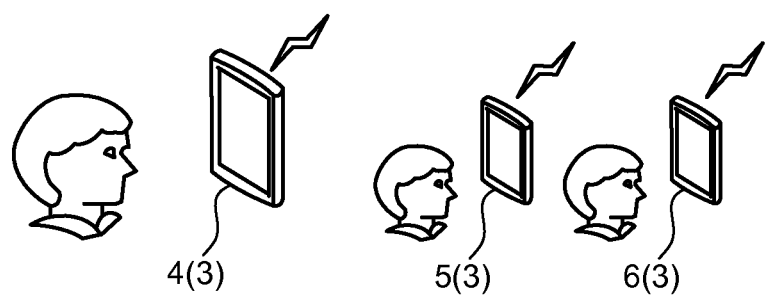

Fig. 3

| COMMUNICATION DIRECTION | MODULE INFORMATION | PORT NO. | AVAILABLE BANDWIDTH [bps] | DELAY TIME [msec] | AVAILABLE BANDWIDTH STANDARD DEVIATION σ | DELAY TIME STANDARD DEVIATION σ |
|---|---|---|---|---|---|---|
| OUTBOUND | Wi-Fi | 49500 | 1M | 100 | 100 | 5 |
| OUTBOUND | 4G | 49501 | 3M | 200 | 200 | 8 |
| OUTBOUND | 3G | 49502 | 300k | 50 | 20 | 2 |
| OUTBOUND | Bluetooth | 49503 | 10M | 400 | 100 | 20 |
| INBOUND | Wi-Fi | 50001 | 10M | 100 | 10 | 10 |
| INBOUND | 4G | 50002 | 30M | 200 | 100 | 5 |
| INBOUND | 3G | 50003 | 1M | 300 | 20 | 3 |
| INBOUND | Bluetooth | 50004 | 10M | 400 | 15 | 20 |

| DATA TYPE INFORMATION | PRIORITY |
|---|---|
| AUDIO DATA | 1 |
| VIDEO DATA | 2 |
| SHARED DOCUMENT DATA | 3 |
| ANNOTATION DATA | 4 |
| FILE TRANSFER DATA | 5 |
| COMMAND DATA | 6 |

| DATA TYPE INFORMATION | BANDWIDTH USAGE [bps] | | BANDWIDTH USAGE STANDARD DEVIATION σ | |
|---|---|---|---|---|
| | OUTBOUND | INBOUND | OUTBOUND | INBOUND |
| AUDIO DATA | 60k | 300k | 1 | 1 |
| VIDEO DATA | 2M | 10M | 10 | 20 |
| SHARED DOCUMENT DATA | 1M | 5M | 500 | 100 |
| ANNOTATION DATA | 100k | 100k | 10 | 10 |
| FILE TRANSFER DATA | 10M | 10M | 400 | 400 |
| COMMAND DATA | 10k | 10k | 2 | 2 |

| COMMUNICATION DIRECTION | MODULE INFORMATION | PORT NO. | DATA TYPE INFORMATION |
|---|---|---|---|
| OUTBOUND | Wi-Fi | 49500 | SHARED DOCUMENT DATA |
| OUTBOUND | 4G | 49501 | VIDEO DATA |
| OUTBOUND | 3G | 49502 | AUDIO DATA, ANNOTATION DATA, COMMAND DATA |
| OUTBOUND | Bluetooth | 49503 | FILE TRANSFER DATA |
| INBOUND | Wi-Fi | 50001 | AUDIO DATA, SHARED DOCUMENT DATA, ANNOTATION DATA, COMMAND DATA |
| INBOUND | 4G | 50002 | VIDEO DATA |
| INBOUND | 3G | 50003 | - |
| INBOUND | Bluetooth | 50004 | FILE TRANSFER DATA |

244

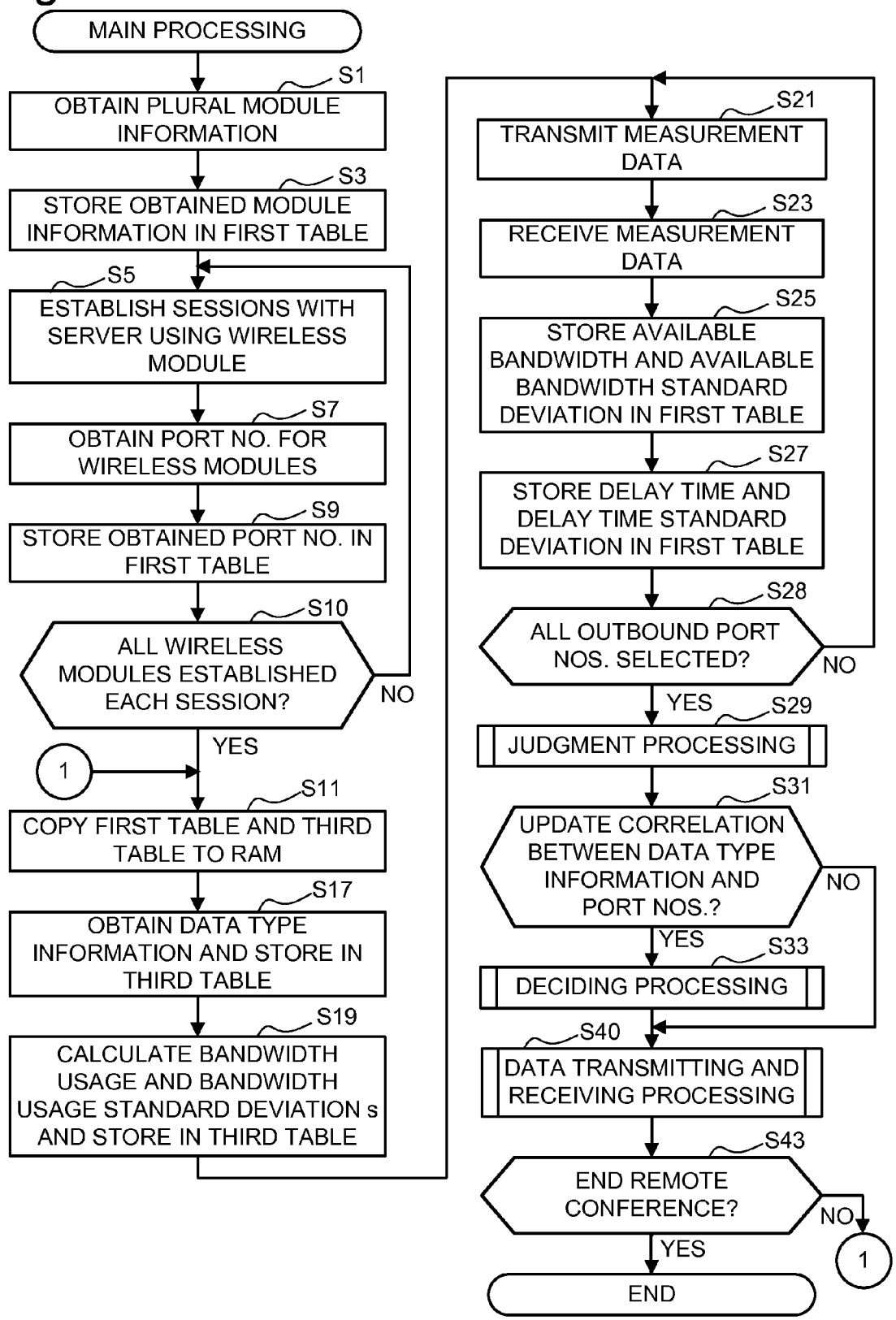

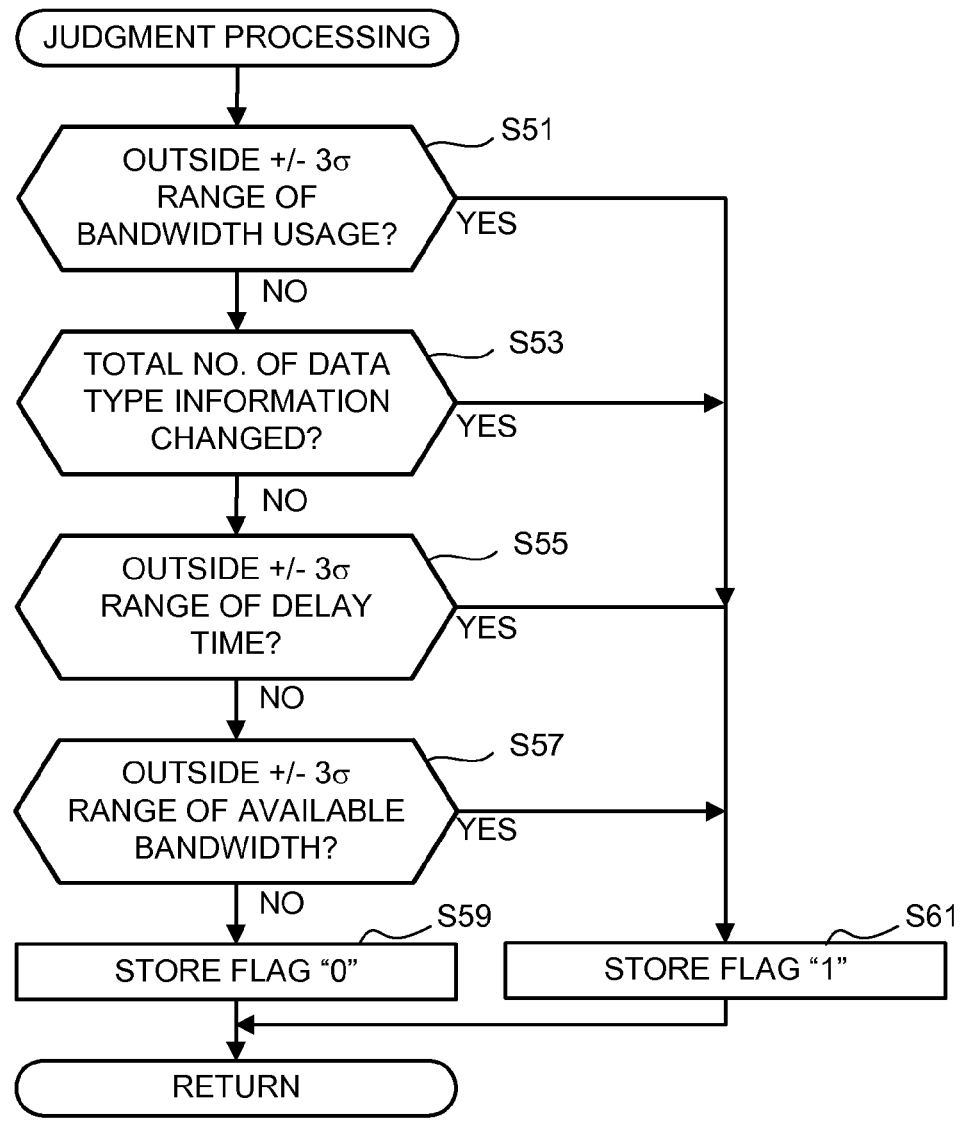

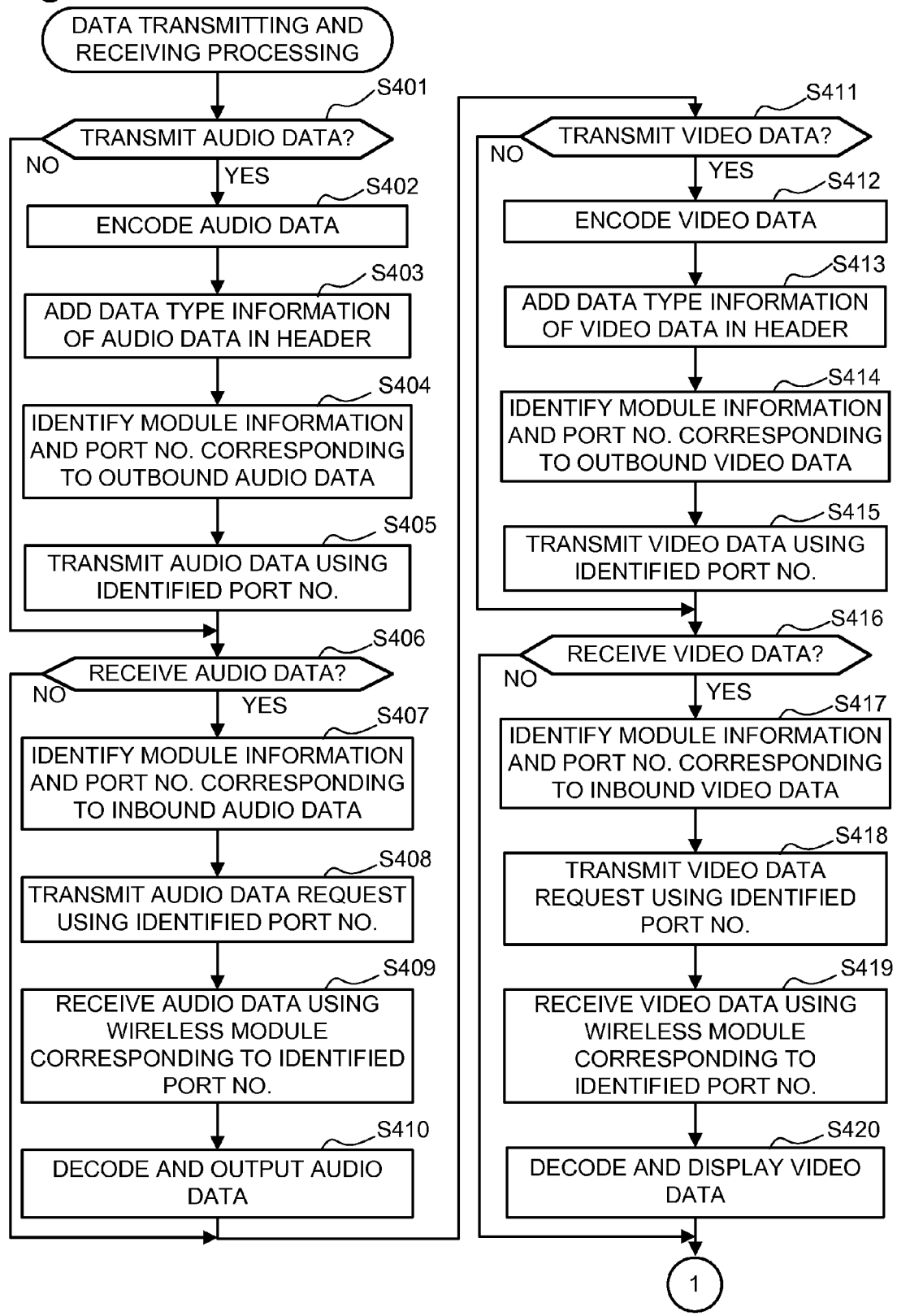

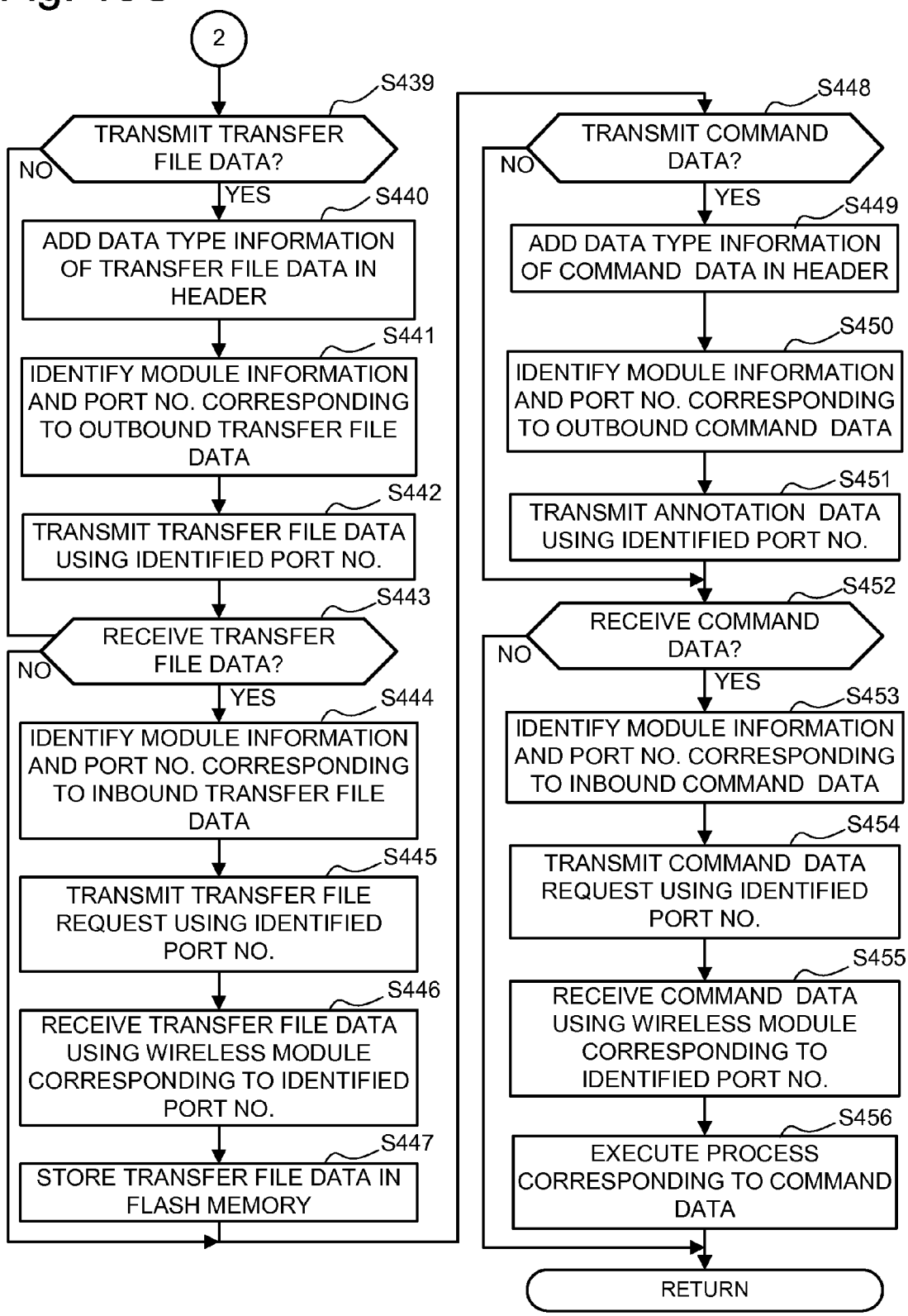

COMMUNICATION TERMINAL AND NON-TRANSITORY COMPUTER READABLE MEDIUM STORING PROGRAM

CROSS REFERENCES TO RELATED APPLICATIONS

This application claims priority to Japanese Patent Application No. 2013-068554 filed on Mar. 28, 2013, the disclosure of which is herein incorporated by reference in its entirety.

BACKGROUND

1. Technical Field

The present disclosure relates to a conference program whereby a communication terminal capable of wireless communication carries out a remote conference, and to a communication terminal.

2. Description of the Related Art

In known systems, a server and a communication terminal perform wireless communication to carry out a remote conference. Also, known devices first perform authentication based on the Near Field Communication (NFC) standard by wireless communication when communication can be made with another device. Then, the known devices switch to wireless communication based on the Bluetooth standard.

SUMMARY OF THE DISCLOSURE

In remote conferences, various types of data are communicated between a server and communication terminal, such as media data, command data for controlling a remote conference application, and the like. The media data may include still image data, moving image data, audio data, and so forth. The amount of data and the permissible delay time during communication differ depending on the type of data, so suitable wireless communication formats also differ depending on the type of data. However, with conventional technology, the wireless communication format has been switched in order as communication with other devices becomes available. As a result, predetermined wireless communication formats have been used regardless of the type of data.

It is an aspect of the present disclosure to provide a storage medium storing a conference program whereby a communication terminal capable of switching wireless communication formats in accordance with the type of data carries out a remote conference, and to a communication terminal.

An aspect of the present disclosure is a non-transitory computer-readable medium storing computer readable instructions. The instructions, when executed by a processor of a communication terminal, perform processes comprising a first obtaining operation, a second obtaining operation, a first storing operation, a third obtaining operation, a second storing operation, and a communicating operation. The first obtaining operation obtains identification information of plural wireless modules provided in the communication terminal, each of the plural wireless modules communicating according to communication formats different each other. The second obtaining operation obtains at least one of a transmission channel capacity and a delay time for each of the plural wireless modules based on data transmitted and received between a server and the communication terminal via each of the plural wireless modules referenced by each of the identification information obtained by the first obtaining operation. The first storing operation stores in a storage device, the at least one of the transmission channel capacities and the delay time obtained by the second obtaining operation in association with each of the identification information of the plural wireless modules. The third obtaining operation obtains data type information relating to plural types of communication data in a remote conference being communicated between the server and the communication terminal. The second storing operation stores in the storage device, the data type information in association with the identification information based on the at least one of a transmission channel capacity and a delay time associated with the identification information in the storage device. The communicating operation communicates with the server using the wireless module referenced by the identification information associated with the data type information based on the data type information and the identification information associated with each other in the storage device.

Another aspect of the present disclosure is a communication terminal comprising a processor, and a memory. The memory stores computer readable instructions, the instructions, when executed by the processor, perform processes comprising, a first obtaining operation, a second obtaining operation, a first storing operation, a third obtaining operation, a second storing operation, and a communicating operation. The first obtaining operation obtains identification information of plural wireless modules provided in the communication terminal, each of the plural wireless modules communicating according to communication formats different each other. The second obtaining operation obtains at least one of a transmission channel capacity and a delay time for each of the plural wireless modules based on data transmitted and received between a server and the communication terminal via each of the plural wireless modules referenced by each of the identification information obtained by the first obtaining operation. The first storing operation stores in a storage device, the at least one of the transmission channel capacities and the delay time obtained by the second obtaining operation in association with each of the identification information of the plural wireless modules. The third obtaining operation obtains data type information relating to plural types of communication data in a remote conference being communicated between the server and the communication terminal. The second storing operation stores in the storage device, the data type information in association with the identification information based on the at least one of a transmission channel capacity and a delay time associated with the identification information in the storage device. The communicating operation communicates with the server using the wireless module referenced by the identification information associated with the data type information based on the data type information and the identification information associated with each other in the storage device.

Yet another aspect of the present disclosure is a non-transitory computer-readable medium storing computer readable instructions. The instructions, when executed by a processor of a communication terminal, perform processes comprising storing, storing, and communicating. The storing stores, in a storage device, each of identification information of plural wireless modules in association with at least one of transmission channel capacities and delay time for each of the plural wireless modules based on data transmitted and received between a server and the communication terminal via each of the plural wireless modules referenced by each of the identification information, the plural wireless modules provided in the communication terminal, each of the plural wireless modules communicating according to communication formats different each other. The storing stores, in the storage device, the identification information based on the at least one of a transmission channel capacity and a delay time associated with the identification information in the storage device in association with data type information relating to plural types of communication data in a remote conference being communicated between the server and the communication terminal. The communicating communicates with the server using the wireless module referenced by the identification information associated with the data type information based on the data type information and the identification information associated with each other in the storage device.

BRIEF DESCRIPTION OF THE DRAWINGS

FIG. 1 is a diagram illustrating an overview of a conference system in accordance with one or more embodiments.

FIG. 3 is a diagram illustrating a first table in accordance with one or more embodiments.

FIG. 4 is a diagram illustrating a second table in accordance with one or more embodiments.

FIG. 5 is a diagram illustrating a third table in accordance with one or more embodiments.

FIG. 6 is a diagram illustrating a fourth table in accordance with one or more embodiments.

FIG. 7 is a flowchart of main processing in accordance with one or more embodiments.

FIG. 8 is a flowchart of determination processing in accordance with one or more embodiments.

FIGS. 10A through 10C are flowcharts of data exchange processing in accordance with one or more embodiments.

DESCRIPTION OF THE PREFERRED EMBODIMENTS

Figure 2:
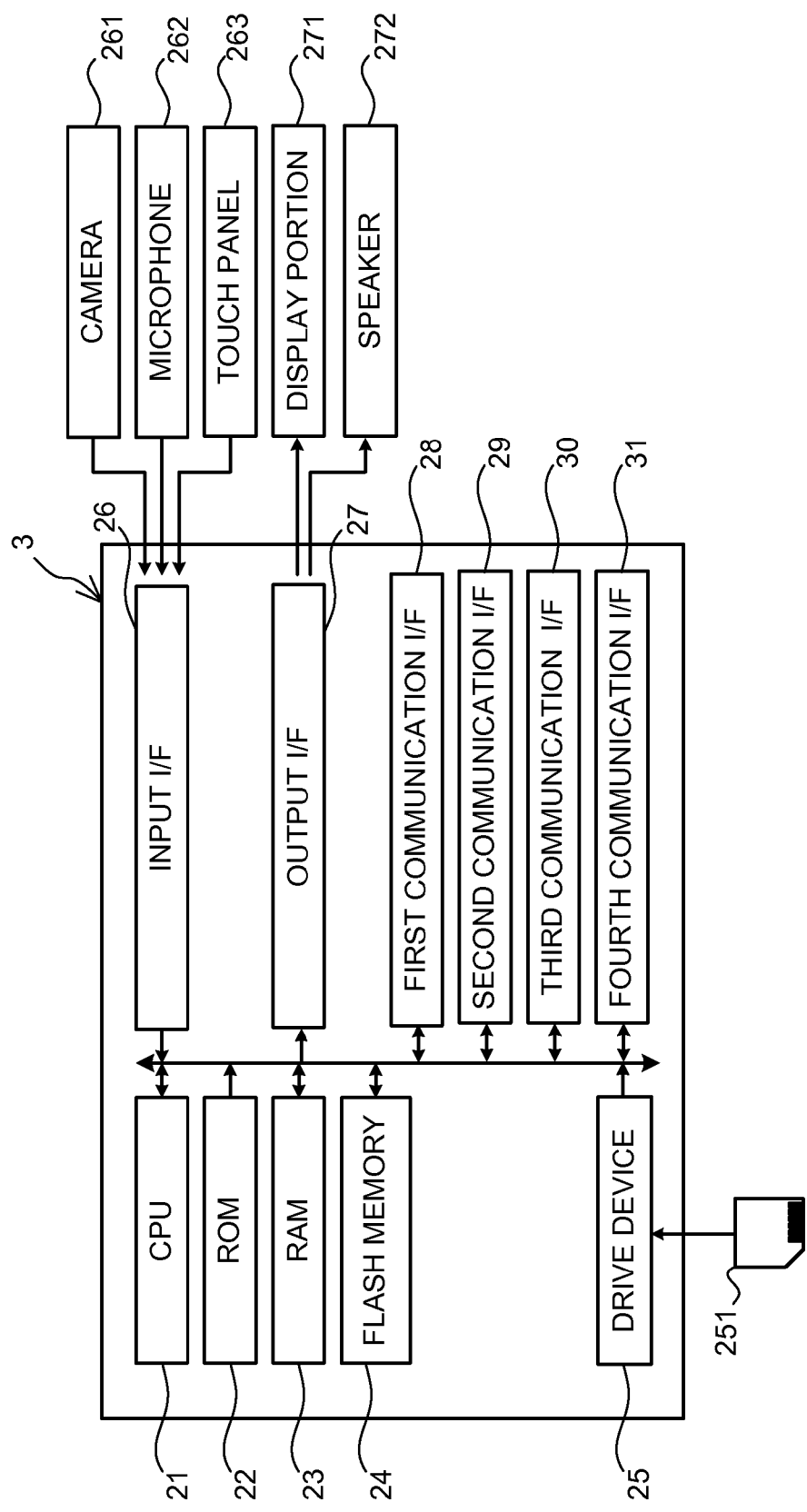
FIG. 2 is a block diagram illustrating an electrical configuration of a communication terminal in accordance with one or more embodiments.

An embodiment of the present disclosure will be described with reference to the drawings. A conference system 1 will be described with reference to FIG. 1. The conference system 1 has a server 2 and communication terminals 4, 5, and 6 (hereinafter also referred to collectively as "communication terminal 3"). The conference system 1 is a remote conference system which enables a remote conference between users of plural communication terminals 3, by communicating video data and audio data among the plural communication terminals 3 via the server 2. For example, the server 2 stores user IDs of users participating in a remote conference using the communication terminals 3 in association with a conference ID that identifies the remote conference. Data transmitted from a communication terminal 3 to the server 2 includes a user ID and conference ID. Accordingly, the server 2 transmits data received from the communication terminal 3 to other terminals having user IDs associated with the conference ID included in the received data.

The server 2 and communication terminals 3 each can communicate via a communication network 14. The communication network 14 includes an Internet network 11 and a public line network 12. A bridge 13 is introduced between the Internet network 11 and the public line network 12. A Wi-Fi router 7 is connected to the Internet network 11. A 4G (4th generation) base station 9 and 3G (3rd Generation) base station 10 are connected to the public line network 12.

The Wi-Fi router 7 can perform wireless communication of a communication format corresponding to the Wi-Fi standard. When the Wi-Fi router 7 has received data from a communication terminal 3 or a Bluetooth-Wi-Fi conversion router 8, the Wi-Fi router 7 transmits the data to the server 2 via the Internet network 11 by wireless communication of a communication format according to the Wi-Fi format. Also, when the Wi-Fi router 7 has received data from the server 2 via the Internet network 11, the Wi-Fi router 7 transmits the data to a communication terminal 3 or the Bluetooth-Wi-Fi conversion router 8 by wireless communication of a communication format according to the Wi-Fi format.

The Bluetooth-Wi-Fi conversion router 8 is a conversion device to perform conversion back and forth between the Bluetooth standard and Wi-Fi standard. The Bluetooth-Wi-Fi conversion router 8 is capable of performing wireless communication of communication formats according to the Bluetooth standard and Wi-Fi standard. When the Bluetooth-Wi-Fi conversion router 8 has received data from the communication terminal 3 by wireless communication of a communication format according to the Bluetooth format, the Bluetooth-Wi-Fi conversion router 8 transmits the data to the Wi-Fi router 7 by wireless communication according to the Wi-Fi standard. Also, when the Bluetooth-Wi-Fi conversion router 8 has received data from the Wi-Fi router 7 by wireless communication of a communication standard according to the Wi-Fi standard, the Bluetooth-Wi-Fi conversion router 8 transmits data to the communication terminal 3 by wireless communication of a communication format according to the Bluetooth standard.

The 4G base station 9 is a base station capable of performing wireless communication of a communication format according to the fourth generation wireless mobile communication standard (also simply "4G standard"). The 3G base station 10 is a base station capable of performing wireless communication of a communication format according to the third generation wireless mobile communication standard (also simply "3G standard"). When the 4G base station 9 and 3G base station 10 each have received data from a communication terminal 3 by wireless communication of a communication format corresponding to the 4G standard or the 3G standard, the 4G base station 9 and 3G base station 10 each transmit the data to the server 2 via the public line network 12 and Internet network 11. Also, when the 4G base station 9 and 3G base station 10 each have received data from the server 2 via the public line network 12 and Internet network 11, the 4G base station 9 and 3G base station 10 each transmit the data to a communication terminal 3 by wireless communication of a communication format corresponding to the 4G standard or the 3G standard.

The bridge 13 is a conversion device which converts the communication standard of the Internet network 11 and the communication standard of the public line network 12 back and forth. When the bridge 13 has received data from the Internet network 11, the bridge 13 converts the data based on the communication standard of the public line network 12, and transmits this data to the public line network 12. When the bridge 13 having received data from the public line network 12, the bridge 13 converts the data based on the communication standard of the Internet network 11, and transmits this data to the Internet network 11. An example of the server 2 is a known multi-point control unit (MCU). A communication terminal 3 is a terminal wirelessly connectable to the Internet network 11. Examples of the communication terminal 3 may be laptop computers, tablet computer, smartphones, and so forth. The communication terminal 3 is capable of performing wireless communication corresponding to each of the Wi-Fi standard, Bluetooth standard, 4G standard, and 3G standard, details of which will be described later. The communication terminal 3 decides the communication format for wireless communication for each type of data which are transmitted and received between the server 2 and the communication terminal 3 during a remote conference. The communication terminal 3 wirelessly communicates with the server 2 by switching between communication formats according to the data type. Hereinafter, transmission channels over which wireless communication is performed by communication formats corresponding to each of the Wi-Fi standard, Bluetooth standard, 4G standard, and 3G standard, will be referred to as "Wi-Fi transmission channel", "Bluetooth transmission channel", "4G transmission channel", and "3G transmission channel", respectively. Note that the communication formats which the communication terminal 3 is capable of using for wireless communication is not restricted to the communication formats corresponding to the Wi-Fi standard, Bluetooth standard, 4G standard, and 3G standard.

The electrical structure of the communication terminal 3 will be described with reference to FIG. 2. The communication terminal 3 includes a CPU 21 which controls the communication terminal 3. Electrically connected to a CPU 21 are ROM 22, RAM 23, flash memory 24, a drive device 25, an input interface (the term "interface" hereinafter abbreviated to "I/F") 26, an output I/F 27, a first communication I/F 28, a second communication I/F 29, a third communication I/F 30, and a fourth communication I/F 31.

A boot program, basic input/output system (BIOS), operating system (OS), and the like are stored in the ROM 22. The OS is a known embedded OS, and runs a later-described conference application. Note that the OS may be stored in the flash memory 24. The RAM 23 is to store timers, counters, and temporary data. The flash memory 24 stores the conference application for causing the CPU 21 to execute the main processing (see FIGS. 7 through 9). Also, the flash memory 24 is to store a first table 241 (see FIG. 3), a second table 242 (see FIG. 4), a third table 243 (see FIG. 5), and a fourth table 244 (see FIG. 6).

The input I/F 26 is an interface circuit for outputting signals, received from a camera 261, microphone 262, and touch panel 263, to the CPU 21. The output I/F 27 is an interface circuit for outputting signals received from the CPU 21 to a display portion 271 and a speaker 272. The first communication I/F 28 is a wireless module for performing wireless communication of a communication format according to the Wi-Fi standard. The second communication I/F 29 is a wireless module for performing wireless communication of a communication format according to the 4G standard. The third communication I/F 30 is a wireless module for performing wireless communication of a communication format according to the 3G standard. The fourth communication I/F 31 is a wireless module for performing wireless communication of a communication format according to the Bluetooth standard.

The drive device 25 reads out data stored in a non-transitory storage medium 251 (e.g., a memory card). For example, at the time of setup of the communication terminal 3, the conference application stored in the storage medium 251 is read out by the drive device 25, and is stored in the flash memory 24 which is a non-transitory storage medium. Now, the term "non-transitory storage medium" is a concept excluding transitory storage medium not capable of storing information (transmission signals, etc.). That is to say, non-transitory storage medium includes all forms of storage media capable of storing information, regardless of how long the information is stored. For example, the RAM 23 is also an example of a non-transitory storage medium. Note that the CPU 21 of the communication terminal 3 may receive the conference application via the communication network 14 and store this in the flash memory 24. In this case, the conference application is stored in a non-transitory storage medium such as a hard disk drive (HDD) of a server (not shown) that is connected via the communication network 14. The conference application is transmitted from the HDD of the server to the flash memory 24 via the communication network 14, as transmission signals which are a transitory recording medium. Note that the conference application executed by the CPU 21 of the communication terminal 3 may be stored in the HDD (not shown) of the server 2. The CPU 21 of the communication terminal 3 may receive the conference application from the server 2 via the communication network 14 and store in the flash memory 24.

The first table 241 through fourth table 244 will be described. As illustrated in FIG. 3, the first table 241 stores communication direction, module information, port No., available bandwidth, delay time, available bandwidth standard deviation σ, and delay time standard deviation σ, in an associated manner. Either "outbound" or "inbound" is stored as the communication direction. "Outbound" indicates the communication direction from the communication terminal 3 toward the server 2, and "inbound" indicates the communication direction from the server 2 toward the communication terminal 3. Module information is information indicating the first communication I/F 28 through fourth communication I/F 31. The port No. is identification information assigned to each wireless module indicated by the module information and is used by a communication protocol, e.g., the Transmission Control Protocol (TCP). These port Nos. are assigned by the OS. The CPU 21 transmits a request to the OS to assign the port Nos. for the first communication I/F 28 through fourth communication I/F 31 to use in a manner distinguished from each other. For example, while the conference application is executed, the CPU 21 transmits and receives data to and from the server 2 following a predetermined application protocol, the Hyper Text Transfer Protocol (HTTP) for example. At the time of transmitting an HTTP packet, the CPU 21 specifies a port No. to the OS to use the transmitting of the HTTP packet. The OS which has received the HTTP packet includes the specified port No. in a TCP packet, and transmits this to the server 2 as a communication packet, using the one of the first communication I/F 28 through fourth communication I/F 31 which has been associated with the port No. Note that the protocol used here is not limited to HTTP, and a proprietary application protocol, for example, may be used. The available bandwidth indicates the average of the transmission channel capacity (in units of bps) per unit time, for each of the Wi-Fi transmission channel, Bluetooth transmission channel, 4G transmission channel, and 3G transmission channel. Delay time is an average of transmission time (in units of ms) of data being transmitted over the communication network 14. The CPU 21 updates the first table 241 by performing the processing of S3, S25, and S27 (see FIG. 7) in the main processing described later.

As shown in FIG. 4, the second table 242 stores data type information and priority in an associated manner. The data type information indicates all types corresponding to all types of data which may be communicated with the server 2 during a remote conference. The second table 242 stores, as the data type information, "audio data", "video data", "shared document data", "annotation data", "file transfer data", and "command data". Also, priorities "1", "2", "3", "4", and "5" are associated with the data type information and stored. "Audio data" indicates data type information of audio data collected by the microphone 262 during the remote conference. "Video data" indicates data type information of video data acquired by the camera 261 during the remote conference. "Shared document data" indicates data type information of documents data displayed on the display portion 271 during the remote conference. "Annotation data" indicates data type information of metadata and tags attached to "shared document data" during the remote conference. "File transfer data" indicates data type information of files downloaded to the communication terminal 3. "Command data" indicates data type information of various control commands to execute the remote conference.

The priority is higher the shorter the delay time of the data type information permitted in the remote conference is. For example, if the delay time of data of data type information "audio data" and "video data" is large, this would create a time gap in conversation between users in the remote conference, preventing from conducting the remote conference smoothly. Accordingly, high priority of "1" and "2" are assigned to the data type information "audio data" and "video data". Also, even if the video is slightly delayed, the remote conference may proceed without hindrance as long as the conversation itself proceeds in real time. Accordingly, the data type information of "audio data" is set to the highest priority of "1". On the other hand, even if the delay time of "file transfer data" and "command data" is large, the remote conference will still proceed smoothly. Accordingly, the low priorities of "5" and "6" are associated with the data type information of "file transfer data" and "command data", respectively.

When the conference application is stored in the flash memory 24, the CPU 21 stores the data type information and priority default values included in the conference application in the second table 242. Note that plural second tables 242 may be provided for each remote conference. Also, the CPU 21 may obtain data type information and priorities from the server 2 and store the obtained data type information and priorities in the second table 242. Alternatively, the CPU 21 may store default values for the data type information and priorities in the second table 242 upon the conference application for a remote conference starting up. Further yet, the CPU 21 may store data type information and priorities accepted from the touch panel 263 by input operations made thereto, in the second table 242 as default values for the data type information and priorities.

As illustrated in FIG. 5, the third table 243 stores data type information, bandwidth usage, and bandwidth usage standard deviation σ, in an associated manner. The bandwidth usage indicates the average of data volume of data of the corresponding data type information per unit time (hereinafter referred to as "bandwidth usage", in units of bps). Bandwidth usage standard deviation σ represents the variation of the bandwidth usage. The CPU 21 updates the third table 243 by executing the processing of S17 and S19 (see FIG. 7) in the main processing described later.

As illustrated in FIG. 6, the fourth table 244 stores communication direction, module information, port No., and data type information, in an associated manner. The fourth table 244 is referred when the CPU 21 communicates with the server 2 during a remote conference, to decide a port No. corresponding to the data type information. The fourth table 244 is updated by the CPU 21 executing the processing of S83 (see FIG. 9) based on the first table 241 through the third table 243.

Figure 9:
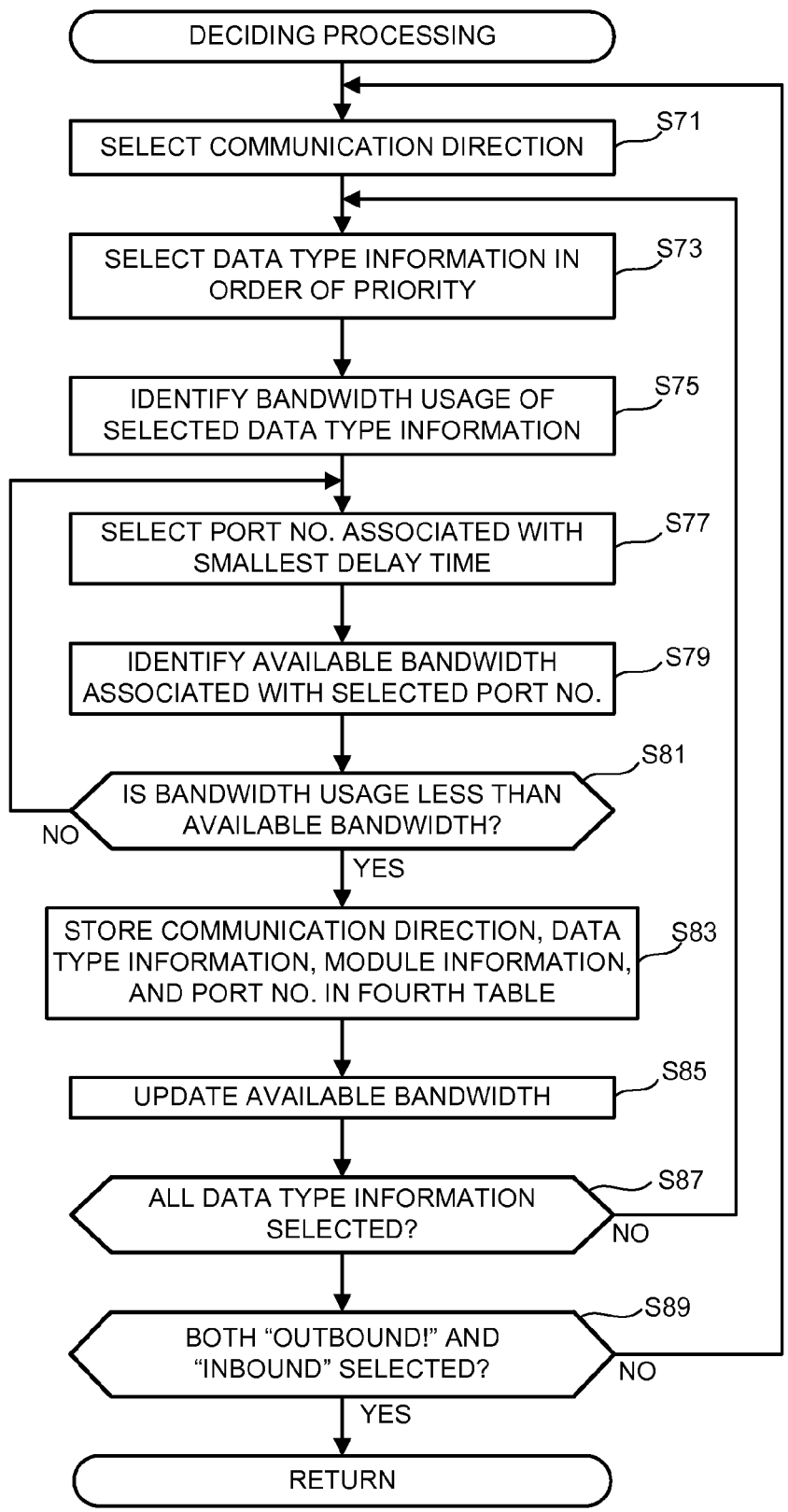
FIG. 9 is a flowchart of deciding processing in accordance with one or more embodiments.

Details of the main processing executed by the CPU 21 of the communication terminal 3 will be described with reference to the flowcharts in FIGS. 7 through 9. In response to receiving an operation at the touch panel 263 to start a conference application, the CPU 21 reads out the conference application stored in the flash memory 24 of the communication terminal 3, and runs the conference application on the OS to start main processing.

As illustrated in FIG. 7, the CPU 21 first queries the OS for specifying available wireless modules. Upon having received a query for specifying available wireless modules, the OS identifies plural wireless modules (first communication I/F 28 through fourth communication I/F 31) connected to the CPU 21 as plural available wireless modules. The CPU 21 obtains plural identification information of the plural wireless modules, i.e., plural module information indicating each of the plural wireless modules (first communication I/F 28 through fourth communication I/F 31) identified by the OS (S1). Note that a wireless module is, for example, an electronic circuit having wireless communication functions, that has been connected to the communication terminal 3. Also, an available wireless module is, for example, a wireless module of which the power has been turned on and driver software for that wireless module has been enabled at the OS. For example, module information indicating a wireless module of which the driver has been disabled at the OS is not obtained in S1. The CPU 21 stores the obtained module information in the first table 241 (see FIG. 3) (S3). Hereinafter, module information corresponding to each of the first communication I/F 28 through fourth communication I/F 31 will be notated as "Wi-Fi", "4G", "3G", and "Bluetooth", respectively. For example, as illustrated in FIG. 3, the CPU 21 stores the module information (Wi-Fi, 4G, 3G, and Bluetooth) indicating each of the plural wireless modules obtained in S1 (see FIG. 7) in the first table 241, in a manner associated with the communication directions "outbound" and "inbound". Note that the CPU 21 may directly identify wireless modules connected to the CPU 21 (first communication I/F 28 through fourth communication I/F 31) to be available wireless modules, without querying the OS.

As illustrated in FIG. 7, the CPU 21 performs wireless communication using each of the plural wireless modules indicated by the plural module information obtained from the OS in S1, and establishes sessions with the server 2 over the Wi-Fi transmission channel, 4G transmission channel, 3G transmission channel, and Bluetooth transmission channel (S5). More specifically, the CPU 21 selects the plural module information obtained in S1 in order, and notifies the OS of instructions to perform wireless communication using the wireless module indicated by the selected module information with data requesting establishing of a session (hereinafter, "establishing request data"). The CPU 21 running the OS controls the selected wireless module so that the establishing request data is transmitted. Also, the CPU 21 running the OS sets the port No. for "outbound" and the port No. for "inbound", to be used with sessions with the server 2, in response to having obtained establishing request data from the conference application. The wireless module transmits the establishing request data with the server 2 as the destination thereof. The "outbound" port No. that has been set is used as the originating port No. of the establishing request data. That is to say, the establishing request data includes a user ID, conference ID, "outbound" port No., and "inbound" port No. that has been set. Note that the establishing request data may include a password corresponding to the user ID.

The establishing request data transmitted from the wireless module is transmitted via a transmission channel corresponding to that wireless module (one of the Wi-Fi transmission channel, 4G transmission channel, 3G transmission channel, and Bluetooth transmission channel), and is received at the server 2. The CPU of the server 2 first records the user ID in association with the conference ID in the HDD. The CPU of the server 2 then stores the port No. of the originator of the establishing request data and the "inbound" port No. included in the establishing request data, in the HDD in an associated manner. Note that the user ID is associated with the set of port Nos. of "outbound" and "inbound" as well. The CPU of the server 2 returns data to establish a session in response to the received establishing request data (hereinafter, referred to as "establishing response data"). The establishing response data corresponding to the establishing request data is transmitted over the same transmission channel as the transmission channel over which the establishing request data was transmitted, and is received by the communication terminal 3.

The wireless module which has transmitted the establishing request data receives the establishing response data transmitted from the server 2. The OS, executed by the CPU 21, obtains the establishing response data from the wireless module. The conference application, executed by the CPU 21, obtains the establishing response data from the OS. A session is established between the server 2 and communication terminal 3. The CPU 21 executes the above processing (S3 and S5) by selecting plural wireless modules (first communication I/F 28 through fourth communication I/F 31) in order. Accordingly, a session is established between the server 2 and the communication terminal 3 through each of the Wi-Fi transmission channel, 4G transmission channel, 3G transmission channel, and Bluetooth transmission channel.

The CPU 21 obtains the "outbound" port No. and "inbound" port No. set, assigned by the OS, at the time of establishing the session (S7). Two port Nos. are obtained for each "outbound" and "inbound", for each of the plural wireless modules. The CPU 21 stores the obtained port Nos. in the first table 241 (see FIG. 3) in a manner associated with the communication direction and module information (S9). As illustrated in FIG. 3, the port Nos. are associated one each with the module information "Wi-Fi", "4G", "3G", and "Bluetooth", associated with each communication direction of "outbound" and "inbound".

Thereafter, the port Nos. stored in first table 241 are used as identification information to identify corresponding wireless modules. The identification information (port Nos.) is necessary to perform wireless communication using the corresponding wireless module. The CPU 21 notifies the OS of the identification information (port No.) associated with the wireless module to perform wireless communication using the corresponding wireless module.

The CPU 21 determines whether or not a session has been established with the server 2 using all wireless modules obtained in S1 (S10). The CPU 21 performs the processing of S10 by determining whether or not there is any module information stored in the first table 241 that has not been associated with a port No. When determination is made in S10 that sessions have been established with the server 2 using all wireless modules, the CPU 21 transitions the process to S11. On the other hand, in the event that determination is made in S10 that sessions have not been established with the server 2 using all wireless modules, the CPU 21 returns the process to S5.

The CPU 21 copies the information stored in the first table 241 (see FIG. 3) and the third table 243 (see FIG. 5) to the RAM 23 (S11). The copied information is used in later-described determining processing (see FIG. 8) to compare each of bandwidth usage, data type information, delay time, and available bandwidth, identified at different timings. Hereinafter, the first table 241 and third table 243 stored in the RAM 23 will be referred to as "first auxiliary table" and "third auxiliary table", respectively.

The CPU 21 obtains data type information of data being used in the remote conference (S17). For example, the CPU 21 queries the conference application, activated when starting the main processing, regarding functions being executed (e.g., audio communication, video communication, shared documents, etc.). The functions and the data type information of data being exchanged in the function have been associated in advance. Also, the CPU 21 can start or stop the functions such as audio communication, video communication, shared documents, and so forth, in accordance with user input while the conference application is being executed. The conference application identifies the data type information of data communication with the server 2 within a predetermined time during the remote conference. The data type information being used in the remote conference may be identified by a different method. For example, the CPU 21 may identify data type information that are permitted by a setting of the conference application to use in the remote conference. The CPU 21 obtains data type information identified by the setting of the conference application. The CPU 21 stores the obtained data type information in the third table 243 (see FIG. 5) (S17).

The CPU 21 calculates bandwidth usage and bandwidth usage standard deviation σ for each data type information and for each of "outbound" and "inbound" (S19). The CPU 21 identifies the data volume (in units of bits) of "outbound" and "inbound" data during the remote conference, for each of the data type information obtained from the conference application in S17. For example, the CPU 21 identifies the data volume of "outbound" data as follows. In a case where the obtained data type information is "audio data" for example, the CPU 21 identifies the data volume based on the sampling speed of sound collected at the microphone 262. In a case where the obtained data type information is "video data" for example, the CPU 21 identifies the data volume based on the resolution, frame rate, and compression format of the video recorded by the camera 261.

Also, the CPU 21 identifies the data volume of "inbound" data as follows, for example. In a case where the obtained data type information is "audio data" for example, the CPU 21 identifies the data volume based on the number of communication terminals 3 participating in the remote conference, and the sampling speed of sound collected at the microphone 262 of each communication terminal 3. In a case where the obtained data type information is "video data" for example, the CPU 21 identifies the data volume based on the number of communication terminals 3 participating in the remote conference, and the resolution and compression format of the video recorded by the camera 261 of each communication terminal 3. The CPU 21 may transmit the sampling speed of the audio data, and the resolution and compression format of the video data to the server 2 along with the user ID and conference ID, when the step S1 is performed or the timing at which the sampling speed of the audio data, and the resolution and compression format of the video data are changed during the conference. Thus, the CPU 21 receives information necessary to identify data volume from the server 2, via one of the plural wireless modules.

Note that other methods may be used for identifying "inbound" data volume. For example, the server 2 may identify the data volume of data to be transmitted to the communication terminal 3 during the remote conference, and transmit to the communication terminal 3 notification data notifying about the identified data volume. The CPU 21 may identify the "inbound" data volume based on this notification data received from the server 2.

The CPU 21 calculates bandwidth usage, which is the data volume per unit time, for each data type information and for each of "outbound" and "inbound", based on the data volume of each of "outbound" and "inbound" that has been identified (S19). The CPU 21 stores the bandwidth usage of each "outbound" and "inbound" that has been calculated in the RAM 23. The bandwidth usage of each of plural "outbound" and "inbound" is stored in the RAM 23 by S19 being repeatedly executed. The CPU 21 calculates the average bandwidth usage for each of "outbound" and "inbound", for each of the data type information, based on the bandwidth usage of each of the plural "outbound" and "inbound" stored in the RAM 23. Note that the average bandwidth usage may be defined as the mean, or alternatively the median or mode or the like. The CPU 21 stores the calculated average bandwidth usage for each of "outbound" and "inbound" in the third table 243 (see FIG. 5), correlated with each of the data type information.

The CPU 21 calculates the bandwidth usage standard deviation σ for each of "outbound" and "inbound", for each of the data type information, based on the bandwidth usage of each of the plural "outbound" and "inbound" stored in the RAM 23. The CPU 21 stores the calculated bandwidth usage standard deviation σ of each of the plural "outbound" and "inbound" in the third table 243, in a manner associated with each of the data type information.

The CPU 21 measures available bandwidth, and the delay time, for each of the plural transmission channels (Wi-Fi transmission channel, 4G transmission channel, 3G transmission channel, and Bluetooth transmission channel) in steps from S21 to S27. As described previously, available bandwidth is the transmission channel capacity per unit time in a case of having communicated with the server 2 using each of the plural wireless modules indicated by the plural module information obtained in S1. The available bandwidth and delay time may be measured by any method, one example of which is described next.

First, the CPU 21 selects the "outbound" port Nos. obtained in S7, from the first table 241 in order. The CPU 21 notifies the OS plural times of instructions to perform wireless communication using the wireless module corresponding to the selected port No., along with the selected port No. and the measurement data. The CPU 21 gradually extends the length of intervals of notification to the OS. Each measurement data includes the point-in-time at which notification was made to the OS as a transmission point-in-time. Also, each measurement data includes the interval of notifications to the OS as a measurement data transmission interval. The OS controls the wireless modules such that measurement data is transmitted via the wireless module indicated by the notified port No. The wireless module transmits the measurement data as individual packet. The OS repeatedly transmits the plural measurement data with the transmission intervals thereof gradually becoming longer, in order to control the wireless modules at the timing at which a notification has been received (S21).

The plural packets, which correspond to the plural measurement data transmitted from the communication terminal 3, are transmitted over the transmission channel corresponding to the wireless module (one of the Wi-Fi transmission channel, 4G transmission channel, 3G transmission channel, and Bluetooth transmission channel) and are received by the server 2. The CPU of the server 2 identifies the point-in-time that each of the plural measurement data has been received, and the reception intervals of the plural measurement data. The CPU of the server 2 identifies the transmission speed (in units of bps) from the communication terminal 3 to the server 2, based on the transmission interval included in each of the plural measurement data, and the data volume of the measurement data. As long as the identified transmission speed is greater than the transmission channel capacity (bps) of the transmission channel over which the measurement data has been transmitted, the identified reception interval is longer than the transmission interval of the plural measurement data transmitted from the communication terminal 3. However, when the transmission interval becomes long and the transmission speed is not greater than the transmission channel capacity per unit time, the reception interval and transmission interval become the same. Thus, the CPU of the server 2 identifies the transmission speed of measurement data at the point where the reception interval becomes equal to the transmission interval as the available bandwidth of "outbound" on the transmission channel over which the measurement data has been transmitted.

Also, the CPU of the server 2 calculates the difference between the transmission point-in-time included in each of the plural measurement data, and the point-in-time of reception of each of the plural measurement data. The CPU of the server 2 identifies the average of plural calculated differences as being the "outbound" delay time.

The CPU of the server 2 identifies the "inbound" port No. corresponding to the originator port No. (i.e., "outbound" port No. of the communication terminal 3), based on the combination of the "outbound" port No. and "inbound" port No. stored in the HDD. The CPU of the server transmits to the communication terminal 3 plural measurement data of which the identified "inbound" port No. is the target port No., while gradually lengthening the transmission intervals. The measurement data includes the transmission point-in-time of the measurement data, the transmission interval of the measurement data, the identified "outbound" available bandwidth, and identified "outbound" delay time. The measurement data is received by the communication terminal 3, having been transmitted over the same transmission channel as the measurement data transmitted by the communication terminal 3 (S23).

The wireless module, which transmitted the measurement data in S21, receives the plural measurement data addressed to the "inbound" port No. from the server 2. The OS obtains the plural measurement data from the wireless module. The CPU 21 of the communication terminal 3 obtains the plural measurement data from the OS. The CPU 21 identifies the point-in-time at which the measurement data was obtained from the OS. The CPU 21 identifies the obtaining interval of obtaining measurement data from the OS as a measurement data reception interval. The CPU 21 identifies the "inbound" available bandwidth, based on the transmission interval included in each of the plural measurement data obtained and the identified reception interval (S25). The CPU 21 identifies the available bandwidth included in the plural measurement data obtained, as the "outbound" available bandwidth (S25). The CPU 21 stores the available bandwidth of each of "outbound" and "inbound" in the RAM 23. The available bandwidth of each of plural "outbound" and "inbound" is stored in the RAM 23 by S25 being repeatedly executed. The CPU 21 calculates the average available bandwidth for each of "outbound" and "inbound", based on the available bandwidth of each of the plural "outbound" and "inbound" stored in the RAM 23. The CPU 21 stores the calculated average available bandwidth for each of "outbound" and "inbound" in the first table 241 (see FIG. 3), associated with the "outbound" and "inbound" port Nos. corresponding to the module information of the wireless module used at the time of transmitting measurement data (S25).

The CPU 21 calculates the available bandwidth standard deviation σ for each of "outbound" and "inbound", based on each available bandwidth of the plural "outbound" and "inbound" stored in the RAM 23. The CPU 21 stores the available bandwidth standard deviation σ for each of "outbound" and "inbound" that has been calculated in the first table 241, in a manner associated with the "outbound" and "inbound" port Nos. corresponding to the module information of the wireless module used to transmit the measurement data (S25).

The CPU 21 calculates the difference between the point-in-time at which each of the plural measurement data was obtained from the OS, and the transmission point-in-time included in each of the plural measurement data. The CPU 21 identifies the average of the plural differences that have been calculated as the "inbound" delay time. The CPU 21 identifies the delay time included in the plural measurement data obtained as the "outbound" delay time. The CPU 21 stores the delay time of each of "outbound" and "inbound" in the RAM 23. The delay time of each of plural "outbound" and "inbound" is stored in the RAM 23 by S27 being repeatedly executed. The CPU 21 calculates the average delay time for each of "outbound" and "inbound", based on the delay time of each of the plural "outbound" and "inbound" stored in the RAM 23. The CPU 21 stores the calculated average delay time for each of "outbound" and "inbound" in the first table 241 (see FIG. 3), associated with the "outbound" and "inbound" port Nos. corresponding to the module information of the wireless module used at the time of transmitting measurement data (S27).

The CPU 21 calculates the delay time standard deviation σ for each of "outbound" and "inbound", based on each delay time of the "outbound" and "inbound" stored in the RAM 23 (S27). The CPU 21 stores the delay time standard deviation σ for each of "outbound" and "inbound" that has been calculated in the first table 241, in a manner associated with the "outbound" and "inbound" port Nos. corresponding to the module information of the wireless module used to transmit the measurement data (S27).

The CPU 21 determines whether or not all the "outbound" port Nos. obtained in S7 have been selected and used for communication of measurement data (S28). When all the "outbound" port Nos. have not been selected and used for communication of measurement data (No in S28), the CPU 21 selects one of the "outbound" port Nos. not yet selected, and repeats the processing of S21, S23, S25, and S27. When all the "outbound" port Nos. have been selected and used for communication of measurement data, this means that the available bandwidth, available bandwidth standard deviation σ, delay time, and delay time standard deviation σ have been identified for each of "outbound" and "inbound" for all transmission channels (Wi-Fi transmission channel, 4G transmission channel, 3G transmission channel, and Bluetooth transmission channel). When all the "outbound" port Nos. have been selected (Yes in S28), the CPU 21 executes judgment processing (see FIG. 8) based on the first table 241 through the third table 243 (S29).

Note that the method to identify the bandwidth usage and available bandwidth of the transmission channels is not restricted to the above-described method. The CPU 21 may identify the bandwidth usage and available bandwidth by other methods. Also, instead of using the standard deviation σ, the CPU 21 may calculate a different variable representing variation (e.g., variance, difference between greatest and smallest values, and so forth) and store in the first table 241. Judgment processing will be described with reference to FIG. 8. The CPU 21 determines whether or not the plural bandwidth usages stored in the third table 243 (see FIG. 5) in S19 (see FIG. 7), hereinafter referred to as "first bandwidth usage", are within a +/−3σ range of their respective bandwidth usages in the third auxiliary table stored in the RAM 23 in S11 (see FIG. 7), hereinafter referred to as "second bandwidth usage" (S51). The "+/−3σ range" means the range from a central value minus triple of a standard deviation σ to the central value plus triple of the standard deviation σ. In S51, the "first bandwidth usage" and the bandwidth usage standard deviation σ correspond to the central value and the standard deviation σ in the third table 243, respectively.

When at least one of the plural first bandwidth usages is outside of the +/−3σ range of the corresponding second bandwidth usage (Yes in S51), the CPU 21 stores flag information "1" in the RAM 23 (S61). In other words, the determination of S51 is affirmed when the "outbound" or "inbound" bandwidth usage changes greatly (3σ or more) in any one of the data type information. The flag information "1" indicates updating of the correlation between the data type information and the port Nos. used to transmit the corresponding data. The CPU 21 then ends the judgment processing, and returns the process to the main processing (see FIG. 7).

When all of the plural first bandwidth usages are within the +/−3σ range of the corresponding second bandwidth usage (No in S51), the CPU 21 compares the total number of data type information stored in the third table 243 (see FIG. 5) in S17 (see FIG. 7), hereinafter referred to as "first type count", with the total number of data type information stored in the third auxiliary table stored in the RAM 23 in S11 (see FIG. 7), hereinafter referred to as "second type count" (S53). When the first type count and the second type count differ (Yes in S53), the CPU 21 stores flag information "1" in the RAM 23 (S61). The CPU 21 then ends the judgment processing, and returns the process to the main processing (see FIG. 7).

When the first type count and the second type count are not differ (No in S53), the CPU 21 determines whether the plural delay times stored in the first table 241 (see FIG. 3) in S27 (see FIG. 7), hereinafter referred to as "first delay time" are within a +/−3σ range of their respective delay times in the first auxiliary table stored in the RAM 23 in S11 (see FIG. 7), hereinafter referred to as "second delay time" (S55). When at least one of the plural first delay time is outside of the +/−3σ range of the corresponding second delay time (Yes in S55), the CPU 21 stores flag information "1" in the RAM 23 (S61). In other words, the determination of S55 is affirmed when the "outbound" or "inbound" delay time changes greatly (3σ or more) in any one of the data type information. The CPU 21 then ends the judgment processing, and returns the process to the main processing (see FIG. 7).

When all of the plural first delay times are within the +/−3σ range of the corresponding second delay times (No in S55), the CPU 21 determines whether or not the plural available bandwidths stored in the first table 241 in S25 (see FIG. 7), hereinafter referred to as "first available bandwidth", are within a +/−3σ range of their respective available bandwidths in the first auxiliary table stored in the RAM 23 in S11 (see FIG. 7), hereinafter referred to as "second available bandwidth" (S57). When at least one of the plural first available bandwidths is outside of the +/−3σ range of the corresponding second available bandwidth (Yes in S57), the CPU 21 stores flag information "1" in the RAM 23 (S61). In other words, the determination of S57 is affirmed when the "outbound" or "inbound" available bandwidth changes greatly (3σ or more) for any one of the plural wireless modules (first communication I/F 28 through fourth communication I/F 31). The CPU 21 then ends the judgment processing, and returns the process to the main processing (see FIG. 7).

When all of the plural first available bandwidths are within the +/−3σ range corresponding second available bandwidths (No in S57), the CPU 21 stores flag information "0" in the RAM 23 (S59). The flag information "0" indicates that the correlation between the data type information and the port Nos. used to transmit the corresponding data will not be updated. The CPU 21 then ends the judgment processing, and returns the process to the main processing (see FIG. 7).

As illustrated in FIG. 7, after the judgment processing (S29) ends, the CPU 21 determines whether or not to update the correlation between the data type information and the port Nos., based on the flag information stored in the RAM 23 (S31). When flag information "0" is stored in the RAM 23, the CPU 21 determines that the correlation between the data type information and the port Nos. will not be updated (No in S31). The CPU 21 stores the information stored in the first auxiliary table in the first table 241. Thus, the CPU 21 returns the state of the first table 241 to that before the first table 241 was updated in S25 and S27 (see FIG. 7). The CPU 21 also stores the information stored in the third auxiliary table in the third table 243. Thus, the CPU 21 returns the state of the third table 243 to that before the third table 243 was updated in S17 and S19 (see FIG. 7). The CPU 21 proceeds the process to S35.

When flag information "1" is stored in the RAM 23, the CPU 21 determines that the correlation between the data type information and the port Nos. will be updated (Yes in S31). Thereupon, the CPU 21 executes deciding processing (S33, see FIG. 9).

The deciding processing will be described with reference to FIG. 9. The CPU 21 selects one of "outbound" and "inbound" as the communication direction (S71). When "outbound" has not been selected yet, the CPU 21 selects "outbound". When "outbound" has already been selected in S71 performed in advance, the CPU 21 selects "inbound".

The CPU 21 refers the second table 242 (see FIG. 4) and the third table 243 (see FIG. 5). The CPU 21 selects, of the data type information stored in the third table 243 in order of associated priority (S73). That is, the CPU 21 selects the data type information associated with the highest priority. The CPU 21 refers the third table 243 (see FIG. 5). The CPU 21 identifies the bandwidth usage corresponding to the selected data type information and the communication direction selected in S71 (S75).

The CPU 21 refers the first table 241 (see FIG. 3). The CPU 21 selects the smallest delay time and a port No. associated with the smallest delay time (S77). The smallest delay time is selected out of the delay times associated with the communication direction selected in S7. The CPU 21 identifies the available bandwidth associated with the port No. selected in S77 (S79). The CPU 21 compares the bandwidth usage identified in S75 and the available bandwidth selected in S79 (S81). When the bandwidth usage is equal to or greater than the available bandwidth, the data volume may exceed the transmission channel capacity of the transmission channel if wireless transmission is performed for the data of the data type information selected in S73 using the port No. selected in S77. When the bandwidth usage is equal to or greater than the available bandwidth (No in S81), the CPU 21 returns the process to S77. The CPU 21 selects the next smallest delay time out of the delay times not selected yet in S77 performed in advance and repeats the processing of S79 and S81.

On the other hand, when the bandwidth usage is less than the available bandwidth, the data volume of data of the data type information, selected in S73, in wireless communication using the port No. selected in S77 may be below the transmission channel capacity of the transmission channel. When the bandwidth usage is less than the available bandwidth (Yes in S81), the CPU 21 selects, from first table 241, module information corresponding to the communication direction selected in S71 and the port No. selected in S77. The CPU 21 stores the communication direction selected in S71, the data type information selected in S73, the port No. obtained in S77, and the selected module information, in the fourth table 244 (see FIG. 6) in an associated manner (S83).

The CPU 21 subtracts the bandwidth usage identified in S75 from the available bandwidth identified in S79, and stores this in the first table 241, thereby updating the available bandwidth in the first table 241 (S85). The CPU 21 determines whether or not all data type information stored in the third table 243 have been selected in S73 (S87). When there is data type information unselected in S73 remaining in the third table 243 (No in S87), the CPU 21 returns the process to S73. The CPU 21 selects, of data type information unselected in S73, that of which the corresponding priority is the highest (S73), and repeats the processing of S75 through S85. In S83, data type information can be associated with one port No. selected in S77, as long as the bandwidth usage is less than the available bandwidth updated in S85.

FIGS. 3 through 6 will be described in detail. The CPU 21 selects "outbound" (S71). The CPU 21 refers the second table 242 (see FIG. 4) and selects, of the data type information included in the third table 243, the data type information "audio data" associated with the highest priority "1" (S73). The CPU 21 refers the third table 243 (see FIG. 5) and identifies the bandwidth usage "60 kbps" associated with "outbound" and "audio data" (S75). The CPU 21 refers the first table 241 (see FIG. 3), selects "50 ms" which is the smallest delay time associated with "outbound", and selects the corresponding port No. "49502" (S77). The CPU 21 identifies the available bandwidth associated with the port No. "49502", which is "300 kbps" (S79). The CPU 21 compares the bandwidth usage "60 kbps" with the available bandwidth "300 kbps" (S81). The bandwidth usage "60 kbps" is less than the available bandwidth "300 kbps" (Yes in S81), so the CPU 21 selects, from the first table 241, the module information "3G" associated with the communication direction "outbound" selected in S71 and the port No. "49502" selected in S77. The CPU 21 stores "outbound", "3G", "49502", and "audio data", and stores in the fourth table 244 (see FIG. 6) (S83). The CPU 21 subtracts the bandwidth usage "60 kbps" from the available bandwidth "300 kbps", and stores "240 kbps" in the first table 241 (S85).

Next, the CPU 21 refers the second table 242 (see FIG. 4) and selects, of the data type information included in the third table 243, the data type information "video data" associated with the next highest priority "2" (S73). The CPU 21 refers the third table 243 (see FIG. 5) and identifies the bandwidth usage "2 Mbps" associated with "outbound" and "video data" (S75). The CPU 21 refers the first table 241 (see FIG. 3), selects "50 ms" which is the smallest delay time associated with "outbound", selects the corresponding port No. "49502" (S77), and identifies the available bandwidth associated with the port No. "49502", which is "240 kbps" (S79). The CPU 21 compares the bandwidth usage "2 Mbps" with the available bandwidth "240 kbps" (S81). The bandwidth usage "2 Mbps" is greater than the available bandwidth "240 kbps" (No in S81), so the CPU 21 selects "100 ms" which is the next smallest delay time in the first table 241, selects the corresponding port No. "49500" (S77), and identifies the corresponding available bandwidth, which is "1 Mbps" (S79). The bandwidth usage "2 Mbps" is greater than the available bandwidth "1 Mbps" (No in S81), so the CPU 21 selects "200 ms" which is the next smallest delay time in the first table 241, selects the corresponding port No. "49501" (S77), and identifies the corresponding available bandwidth, which is "3 Mbps" (S79). The bandwidth usage "2 Mbps" is less than the available bandwidth "3 Mbps" (Yes in S81), so the CPU 21 selects, from the first table 241, the module information "4G" associated with the communication direction "outbound" selected in S71 and the port No. "49501" selected in S77. The CPU 21 associates "outbound", "4G", "49501", and "video data", and stores in the fourth table 244 (see FIG. 6) (S83). The CPU 21 subtracts the bandwidth usage "2 Mbps" from the available bandwidth "3 Mbps", and stores "1 Mbps" in the first table 241 (S85).

This processing is repeated, and the CPU 21 refers the second table 242 (see FIG. 4) and selects, of the data type information included in the third table 243, the data type information "annotation data" associated with the priority "4" (S73). The CPU 21 refers the third table 243 (see FIG. 5) and identifies the bandwidth usage "100 kbps" associated with "outbound" and "annotation data" (S75). The CPU 21 refers the first table 241 (see FIG. 3), selects "50 ms" which is the smallest delay time associated with "outbound", selects the corresponding port No. "49502" (S77), and identifies the available bandwidth associated with the port No. "49502", which is "240 kbps" (S79). The CPU 21 compares the bandwidth usage "100 kbps" with the available bandwidth "240 kbps" (S81). The bandwidth usage "100 kbps" is less than the available bandwidth "240 kbps" (Yes in S81), so the CPU 21 selects, from the first table 241, the module information "3G" associated with the communication direction "outbound" selected in S71 and the port No. "49502" selected in S77. The CPU 21 stores "outbound", "3G", "49502", and "annotation data", and stores in the fourth table 244 (see FIG. 6) (S83). Thus, data type information are associated with a single port No.

When all types stored in the third table 243 have been selected in S73 (Yes in S87), the CPU 21 determines whether or not both communication directions "outbound" and "inbound" have been selected in S71 (S89). In the event of determining that the communication direction "inbound" has not been selected yet (No in S89), the CPU 21 returns the process to S71. The CPU 21 selects the communication direction "inbound" (S71), and repeats the processing of S73 through S87.

When the communication directions both "outbound" and "inbound" have been selected (Yes in S89), and the available bandwidth has been updated in S85, the CPU 21 overwrites the updated available bandwidth with the corresponding available bandwidth in the first preliminary table stored in the RAM 23. Thus, the available bandwidth is returned to the state before having been updated. The CPU 21 ends the deciding processing, and returns the process to the main processing (see FIG. 7).

Figure 10B:
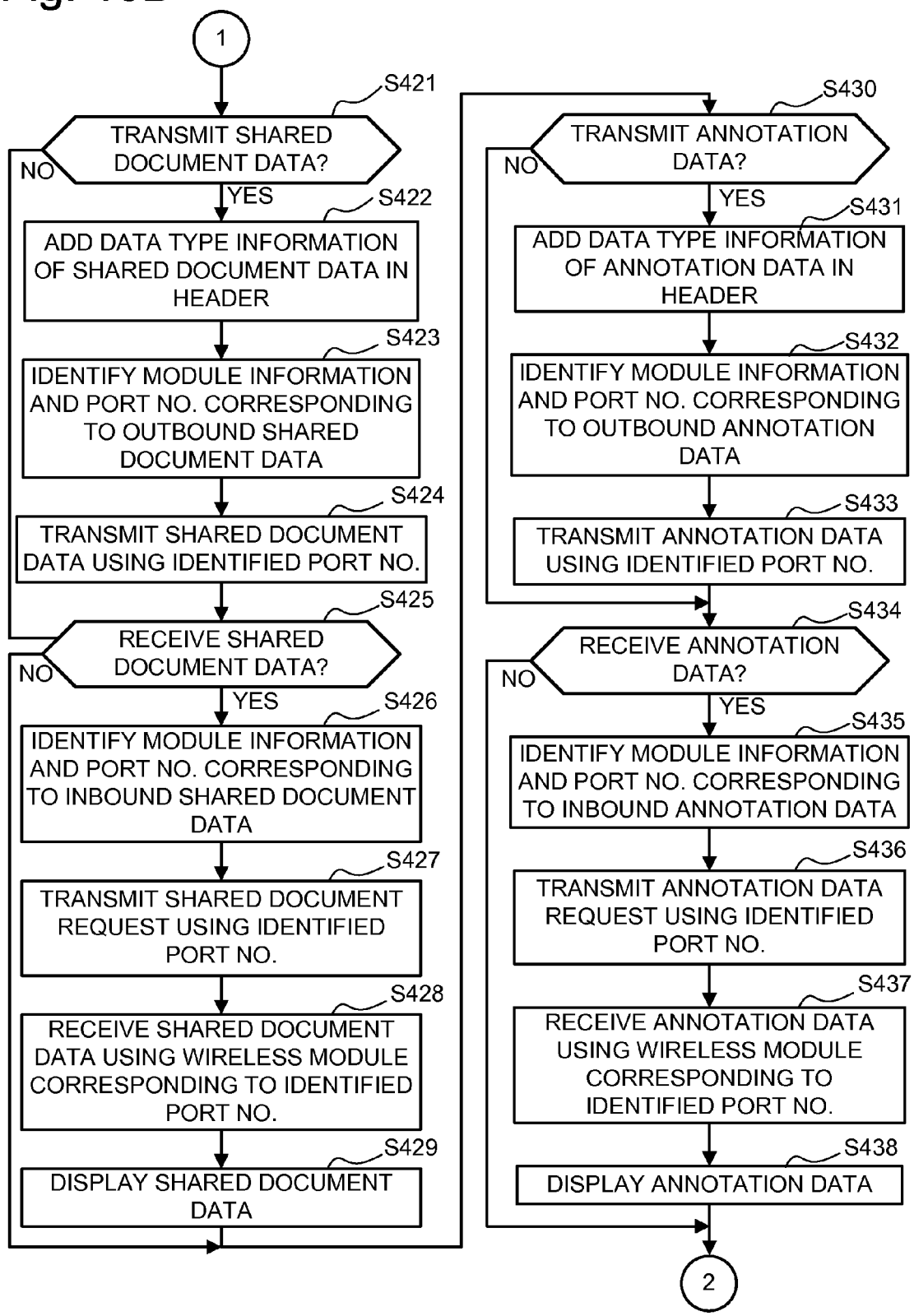

As illustrated in FIG. 7, after the deciding processing has ended (S33), in S40 the CPU 21 performs data transmitting and receiving processing. The data transmitting and receiving processing is a process that the CPU 21 decides a port No. for each data type information based on the fourth table 244, and communicates with the server 2 using the decided port Nos. Hereinafter, this will be described in detail with reference to FIGS. 10A through 10C. With the present embodiment, a Web conference is an example of a remote conference. Accordingly, the audio data and video data are not multiplexed, but are transmitted to the server and received from the server as individual packets.

As illustrated in FIG. 10A, the CPU 21 determines whether or not to transmit audio data (S401). Examples of audio data may include waveform data, obtained by performing A/D conversion of analog signals obtained by the microphone 262 at the input I/F 26. The CPU 21 transmits an instruction to the input I/F 26 at the start of the main processing, thereby starting obtaining the audio data. For example, the CPU 21 performs the determination of S401 by determining whether or not audio data has been obtained during a predetermined period. This predetermined period may be fixed, or may be changed as appropriate in accordance with the communication environment or by user settings. When determined to transmit audio data (Yes in S401), the CPU 21 transitions the process to S402. On the other hand, when determined not to transmit audio data (No in S401), the CPU 21 transitions the process to S406.

The CPU 21 encodes the audio data using a predetermined format (S402). Any format may be employed for encoding of the audio data. For example, G.711 and G.722, stipulated by H.323, may be used to encode the audio data.

The CPU 21 adds data type information to the header of the audio data encoded in S402, indicating that it is audio data (S403). At this time, the CPU 21 also adds the conference ID and user ID to the header of the audio data.

The CPU 21 identifies that the data to be transmitted is audio data, based on the data type information included in the header. The CPU 21 then refers the fourth table 244 and identifies the module information and port No. to be used for transmitting audio data in the communication direction "outbound" (S404). In the example illustrated in FIG. 6, "3G" is identified as the module information, and "49502" as the port No.

The CPU 21 notifies the OS of an instruction to perform wireless communication using the wireless module of the identified module information, along with the identified port No. and audio data (S405). In the example illustrated in FIG. 6, the port No. "49502", the address information of the server 2, and the audio data, are transmitted from the conference application to the OS. The CPU 21 which runs the OS controls the wireless module "3G" indicated by the notified port No. so as to transmit the notified audio data to the server 2. For example, a TCP header and IP header are added to the audio data by the CPU 21 running the OS, and this audio data is transmitted to the server 2. Thus, audio data is transmitted from the communication terminal 3 to the server 2.

The CPU 21 determines whether or not to receive the audio data (S406). For example, in a case of using a stateless application protocol such as HTTP, the CPU 21 performs the determination of S401 by determining whether or not the predetermined period for obtaining the audio data has elapsed. Note that this predetermined period may be individually set to each of the other communication terminals 3 connected to the server 2 and participating in the remote conference. The predetermined time may be fixed or may be changed as appropriate in accordance with the communication environment or by user settings. Also, in a case of using a stateful application protocol in which a connection state is maintained, the CPU 21 may perform the determination of S401 by determining whether or not a notification, indicating transmission of audio data from the server 2, has been received from the server 2 via any of the available wireless modules. When determined to receive the audio data (Yes in S406), the CPU 21 transitions the process to S407. On the other hand, when determined not to receive the audio data (No in S406), the CPU 21 transitions the process to S411.

The CPU 21 refers the fourth table 244 and identifies the module information and port No. to be used for reception of audio data in the communication direction "inbound" (S407). With the example illustrated in FIG. 6, "Wi-Fi" is identified as module information, and "50001" is identified as the port No.

The CPU 21 transmits an audio data request requesting the audio data transmitted from another communication terminal 3, to the server 2 (S408) The audio data request includes conference ID, user ID, and data type information. The audio data has already been transmitted from another communication terminal 3 to the server 2, by the other communication terminal 3 having executed the above-described S405. The CPU 21 notifies the OS of the instruction to perform wireless communication using the wireless module of the module information identified in S407, for example, along with the identified port No. and audio data request. In the example illustrated in FIG. 6, the port No. "50001", the address information of the server 2, and the audio data request, are transmitted from the conference application to the OS. The CPU 21 running the OS controls the wireless module "Wi-Fi" indicated by the notified port No. to transmit the notified audio data request to the server 2.

The CPU 21 receives the audio data from the server 2 in response to the sound data request transmitted in S408 (S409). For example, the CPU 21 receives the audio data addressed to port No. "50001" from the server 2, via the wireless module "Wi-Fi" used in S408.

The CPU 21 decodes the audio data received in S409 according to a predetermined format (S410). Any format may be employed for decoding of the audio data. For example, the audio codec used in S402 may be used to decode the audio data. The CPU 21 transmits an instruction to output the decoded audio data as sound, to the speaker 272 via the output I/F 27.

The CPU 21 determines whether or not to transmit video data (S411). An example of video data may be a set of plural image data obtained by performing A/D conversion at the input I/F 26 on analog signals obtained every predetermined period by the camera 261. The CPU 21 transmits an instruction to the input I/F 26 at the start of the main processing, thereby starting obtaining the video data. For example, the CPU 21 performs the determination of S411 by determining whether or not a predetermined amount of video data has been obtained. The predetermined amount of video data may be decided based in any indicator, such as data size, number of frames (i.e., number of images), time elapsed, and so forth. The predetermined amount may also be fixed or may be changed as appropriate in accordance with the communication environment or by user settings. When determined to transmit video data (Yes in S411), the CPU 21 transitions the process to S412. On the other hand, when determined not to transmit video data (No in S411), the CPU 21 transitions the process to S416.

The CPU 21 encodes the video data using a predetermined format (S412). Any format may be employed for encoding of the video data. For examples, video codecs H.261 and H.263, stipulated by H.232, may be used to encode the video data.

The CPU 21 adds data type information to the header of the video data encoded in S412, indicating that it is video data (S413). At this time, the CPU 21 also adds the conference ID and user ID to the header of the video data.

The CPU 21 identifies that the data to be transmitted is video data, based on the data type information included in the header. The CPU 21 then refers the fourth table 244 and identifies the module information and port No. to be used for transmitting video data in the communication direction "outbound" (S414). In the example illustrated in FIG. 6, "4G" is identified as the module information, and "49501" as the port No.

The CPU 21 notifies the OS of an instruction to perform wireless communication using the wireless module of the identified module information, along with the identified port No. and video data (S415). In the example illustrated in FIG. 6, the port No. "49501", the address information of the server 2, and the video data, are transmitted from the conference application to the OS. The CPU 21 which runs the OS controls the wireless module "4G" indicated by the notified port No. so as to transmit the notified video data to the server 2. For example, a TCP header and IP header are added to the packets of video data by the CPU 21 running the OS, and this video data is transmitted to the server 2. Thus, video data is transmitted from the communication terminal 3 to the server 2.

The CPU 21 determines whether or not to receive the video data (S416). For example, in a case of using a stateless application protocol such as HTTP, the CPU performs the determination of S416 by determining whether or not the predetermined period for obtaining the video data has elapsed. Note that this predetermined period may be individually set to each of the other communication terminals 3 connected to the server 2 and participating in the remote conference. The predetermined time may be fixed or may be changed as appropriate in accordance with frame rate or the like. Also, in a case of using a stateful application protocol in which a connection state is maintained, the CPU 21 may perform the determination of S416 by determining whether or not a notification, indicating transmission of video data from the server 2, has been received via any of the available wireless modules. When determined to receive the video data (Yes in S416), the CPU 21 transitions the process to S417. On the other hand, when determined not to receive the video data (No in S416), the CPU 21 transitions the process to S421.

The CPU 21 refers the fourth table 244 and identifies the module information and port No. to be used for reception of video data in the communication direction "inbound" (S417). With the example illustrated in FIG. 6, "4G" is identified as module information, and "50002" is identified as the port No.

The CPU 21 transmits a video data request requesting the video data transmitted from another communication terminal 3, to the server 2 (S418). The video data request includes conference ID, user ID, and data type information. The video data has already been transmitted from another communication terminal 3 to the server 2, by the other communication terminal 3 having executed the above-described S415. The CPU 21 notifies the OS of the instruction to perform wireless communication using the wireless module of the module information identified in S417, for example, along with the identified port No. and video data request. In the example illustrated in FIG. 6, the port No. "50002", the address information of the server 2, and the video data request, are transmitted from the conference application to the OS. The CPU 21 running the OS controls the wireless module "4G" indicated by the notified port No. to transmit the notified video data request to the server 2.

The CPU 21 receives the video data from the server 2 in response to the video data request transmitted in S418 (S419). For example, the CPU 21 receives the video data addressed to port No. "50002" from the server 2, via the wireless module "4G" used in S418.

The CPU 21 decodes the video data received in S419 according to a predetermined format (S420). Any format may be employed for decoding of the video data. For example, the video codec used in S412 may be used to decode the video data. The CPU 21 transmits an instruction to output the decoded video data as video, to the display portion 271 via the output I/F 27.

The CPU 21 determines whether or not to transmit shared document data (S421). Examples of shared document data may include document files, such as text files, presentation files, spreadsheet files, and so forth, and media files such as MPEG data and the like. The shared document data are stored in a predetermined storage medium. The predetermined storage medium may be flash memory 21, or may be online storage connected via network. Also, the shared document data may be image data where a display window of another application being executed by the CPU 21 is captured, for example. The CPU 21 performs the determination in S421 by determining whether or not an input, designating the shared document data in a shared document function, has been received from the touch panel 263 for example. When determined to transmit shared document data (Yes in S421), the CPU 21 transitions the process to S422. On the other hand, when determined not to transmit shared document data (No in S421), the CPU 21 transitions the process to S425.

The CPU 21 adds data type information to the header of the shared document data selected in S421, indicating that it is shared document data (S422). At this time, the CPU 21 also adds the conference ID and user ID to the header of the shared document data.

The CPU 21 identifies that the data to be transmitted is shared document data, based on the data type information included in the header. The CPU 21 then refers the fourth table 244 and identifies the module information and port No. to be used for transmitting shared document data in the communication direction "outbound" (S423). In the example illustrated in FIG. 6, "Wi-Fi" is identified as the module information, and "49500" as the port No.

The CPU 21 notifies the OS of an instruction to perform wireless communication using the wireless module of the identified module information, along with the identified port No. and shared document data (S424). In the example illustrated in FIG. 6, the port No. "49500", the address information of the server 2, and the shared document data, are transmitted from the conference application to the OS. The CPU 21 which runs the OS controls the wireless module "Wi-Fi" indicated by the notified port No. so as to transmit the notified shared document data to the server 2. For example, a TCP header and IP header are added to the packets of the shared document data by the CPU 21 running the OS, and this shared document data is transmitted to the server 2. Thus, shared document data is transmitted from the communication terminal 3 to the server 2.

The CPU 21 determines whether or not to receive the shared document data (S425). For example, in a case of using a stateless application protocol such as HTTP, the CPU 21 transmits a confirmation request to the server 2 to confirm whether or not there is shared document data, using any available wireless module. The server 2 transmits whether or not there is any shared document data that has been transmitted to the server 2 from another communication terminal 3, to the communication terminal 3 as a response to the confirmation request. The CPU 21 performs the determination of S425 based on the response received from the server 2 by any available wireless module. Also, in a case of using a stateful application protocol, the CPU 21 may perform the determination of S425 by determining whether or not a notification, indicating transmission of shared document data that has been transmitted the server 2 from another communication terminal 3, has been received from the server 2 by any of the available wireless modules. When determined to receive the shared document data (Yes in S425), the CPU 21 transitions the process to S426. On the other hand, when determined not to receive the shared document data (No in S425), the CPU 21 transitions the process to S430.

The CPU 21 refers the fourth table 244 and identifies the module information and port No. to be used for reception of shared document data in the communication direction "inbound" (S426). With the example illustrated in FIG. 6, "Wi-Fi" is identified as module information, and "50001" is identified as the port No.

The CPU 21 transmits a shared document data request requesting the shared document data transmitted from another communication terminal 3, to the server 2 (S427). The shared document data request includes conference ID, user ID, and data type information. The shared document data has already been transmitted from another communication terminal 3 to the server 2, by the other communication terminal 3 having executed the above-described S424. The CPU 21 notifies the OS of the instruction to perform wireless communication using the wireless module of the module information identified in S426, for example, along with the identified port No. and shared document data request. In the example illustrated in FIG. 6, the port No. "50001", the address information of the server 2, and the shared document data request, are transmitted from the conference application to the OS. The CPU 21 running the OS controls the wireless module "Wi-Fi" indicated by the notified port No. to transmit the notified shared document data request to the server 2.

The CPU 21 receives the shared document data from the server 2 in response to the shared document data request transmitted in S427 (S428). For example, the CPU 21 receives the shared document data addressed to port No. "50001" from the server 2, via the wireless module "Wi-Fi" used in S427.

The CPU 21 outputs the shared document data received in S428 on the display portion 271 via the output I/F 27 (S429). The shared document data is output to the display portion 271 as a separate window from the video data, in accordance with the layout at the communication terminal 3.

The CPU 21 determines whether or not to transmit annotation data (S430). Annotation data may include a set of coordinate data input by way of the touch panel 263, for example Annotation data may also include information identifying display data onto which the annotation data is to be superimposed. The CPU 21 performs the determination in S430 by determining whether or not an input, instructing transmission of annotation data, has been received from the touch panel 263, for example. This instruction is input to the touch panel 263 as to of a position on shared document data being displayed, when an annotation input function has been enabled, for example. When determined to transmit annotation data (Yes in S430), the CPU 21 transitions the process to S431. On the other hand, when determined not to transmit annotation data (No in S430), the CPU 21 transitions the process to S434.

In S431, the CPU 21 adds data type information to the header of the annotation data accepted in S430, indicating that it is annotation data (S431). At this time, the CPU 21 also adds the conference ID and user ID to the header of the annotation data.

The CPU 21 identifies that the data to be transmitted is annotation data, based on the data type information included in the header. The CPU 21 then refers the fourth table 244 and identifies the module information and port No. to be used for transmitting annotation data in the communication direction "outbound" (S432). In the example illustrated in FIG. 6, "3G" is identified as the module information, and "49502" as the port No.

The CPU 21 notifies the OS of an instruction to perform wireless communication using the wireless module of the identified module information, along with the identified port No. and the annotation data (S433). In the example illustrated in FIG. 6, the port No. "49502", the address information of the server 2, and the annotation data, are transmitted from the conference application to the OS. The CPU 21 which runs the OS controls the wireless module "3G" indicated by the notified port No. so as to transmit the notified annotation data to the server 2. For example, a TCP header and IP header are added to the packets of the annotation data by the CPU 21 running the OS, and this annotation data is transmitted to the server 2. Thus, annotation data is transmitted from the communication terminal 3 to the server 2.

The CPU 21 determines whether or not to receive the annotation data (S434). For example, in a case of using a stateless application protocol such as HTTP, the CPU 21 transmits a confirmation request to the server 2 to confirm whether or not there is annotation data, using any available wireless module. The server 2 transmits whether or not there is any annotation data that has been transmitted to the server 2 from another communication terminal 3, to the communication terminal 3 as a response to the confirmation request. The CPU 21 performs the determination of S434 based on the response received from the server 2 by any available wireless module. Also, in a case of using a stateful application protocol, the CPU 21 may perform the determination of S434 by determining whether or not a notification, indicating transmission of annotation data that has been transmitted to the server 2 from another communication terminal 3, has been received from the server 2 by any of the available wireless modules. When determined to receive the annotation data (Yes in S434), the CPU 21 transitions the process to S435. On the other hand, when determined not to receive the annotation data (No in S434), the CPU 21 transitions the process to S439.

The CPU 21 refers the fourth table 244 and identifies the module information and port No. to be used for reception of annotation data in the communication direction "inbound" (S435). With the example illustrated in FIG. 6, "Wi-Fi" is identified as module information, and "50001" is identified as the port No.

The CPU 21 transmits an annotation data request requesting the annotation data transmitted from another communication terminal 3, to the server 2 (S436). The annotation data request includes conference ID, user ID, and data type information. The annotation data has already been transmitted from another communication terminal 3 to the server 2, by the other communication terminal 3 having executed the above-described S433. The CPU 21 notifies the OS of the instruction to perform wireless communication using the wireless module of the module information identified in S435, for example, along with the identified port No. and annotation data request. In the example illustrated in FIG. 6, the port No. "50001", the address of the server 2, and the annotation data request, are transmitted from the conference application to the OS. The CPU 21 running the OS controls the wireless module "Wi-Fi" indicated by the notified port No. to transmit the notified annotation data request to the server 2.

The CPU 21 receives the annotation data from the server 2 in response to the annotation data request transmitted in S436 (S437). For example, the CPU 21 receives the annotation data addressed to port No. "50001" from the server 2, via the wireless module "Wi-Fi" used in S436.

The CPU 21 outputs the annotation data received in S437 on the display portion 271 via the output I/F 27 (S438). For example, the CPU 21 outputs an instruction to the output I/F 27, to render an image corresponding to the coordinate data included in the received annotation data, on a window corresponding to information included in the annotation data which identifies data being displayed onto which the annotation data is to be superimposed.

The CPU 21 determines whether or not to transmit transfer file data (S439). Transfer file data may include document files, such as text files, presentation files, spreadsheet files, and so forth, and media files such as MPEG data and the like, stored in a flash memory 21, for example. Unlike shared document data, the content of transfer file data is not displayed on the display portion 271 during the remote conference. Instead, the transfer file data will be stored in a storage medium of the server 2, or online storage to which the server 2 can connect, in a manner associated with the conference ID. The CPU 21 performs the determination in S439 by determining whether or not an input, designating the transfer file data in a file transfer function, has been received from the touch panel 263 for example. When determined to transmit transfer file data (Yes in S439), the CPU 21 transitions the process to S440. On the other hand, when determined not to transmit transfer file data (No in S439), the CPU 21 transitions the process to S443.

The CPU 21 adds data type information to the header of the transfer file data accepted in S439, indicating that it is transfer file data (S440). At this time, the CPU 21 also adds the conference ID and user ID to the header of the transfer file data.

The CPU 21 identifies that the data to be transmitted is transfer file data, based on the data type information included in the header. The CPU 21 then refers the fourth table 244 and identifies the module information and port No. to be used for transmitting transfer file data in the communication direction "outbound" (S441). In the example illustrated in FIG. 6, "Bluetooth" is identified as the module information, and "49503" is identified as the port No.

The CPU 21 notifies the OS of an instruction to perform wireless communication using the wireless module of the identified module information, along with the identified port No. and transfer file data (S442). In the example illustrated in FIG. 6, the port No. "49503", the address information of the server 2, and the transfer file data, are transmitted from the conference application to the OS. The CPU 21 which runs the OS controls the wireless module "Bluetooth" indicated by the notified port No. so as to transmit the notified transfer file data to the server 2. For example, a TCP header and IP header are added to the packets of the transfer file data by the CPU 21 running the OS, and this transfer file data is transmitted to the server 2. Thus, transfer file data is transmitted from the communication terminal 3 to the server 2.

The CPU 21 determines whether or not to receive the transfer file data (S443). For example, the CPU 21 performs the determination of S443 by determining whether an instruction to download transfer file data stored in the storage medium of the server 2 has been received from the touch panel 263. Note that the transfer file data to download is selected from those associated with the conference ID of the remote conference currently being carried out. When determined to receive the transfer file data (Yes in S443), the CPU 21 transitions the process to S444. On the other hand, when determined not to receive the transfer file data (No in S443), the CPU 21 transitions the process to S448.

The CPU 21 refers the fourth table 244 and identifies the module information and port No. to be used for reception of transfer file data in the communication direction "inbound" (S444). With the example illustrated in FIG. 6, "Bluetooth" is identified as module information, and "50004" is identified as the port No.

The CPU 21 transmits a transfer file data request requesting reception of the transfer file data transmitted from another communication terminal 3, to the server 2 (S445). The transfer file data request includes conference ID, ID, and data type information. The CPU 21 notifies the OS of the instruction to perform wireless communication using the wireless module of the module information identified in S444, for example, along with the identified port No. and transfer file data request. In the example illustrated in FIG. 6, the port No.

"50004", the address information of the server 2, and the transfer file data request, are transmitted from the conference application to the OS. The CPU 21 running the OS controls the wireless module "Bluetooth" indicated by the notified port No. to transmit the notified transfer file data request to the server 2.

The CPU 21 receives the transfer file data from the server 2 in response to the transfer file data request transmitted in S445 (S446). For example, the CPU 21 receives the transfer file data addressed to port No. "50004" from the server 2, via the wireless module "Bluetooth" used in S445.

The CPU 21 stores the transfer file data received in S446 in the flash memory 21 (S447).

The CPU 21 determines whether or not to transmit command data (S448). Command data is an instruction to cause the conference application being run at another communication terminal 3 to execute predetermined functions. Examples of command data include instructions to mute or change volume of a speaker or a microphone of another communication terminal 3, instructions to change the display layout for the conference application at another communication terminal 3, and so forth. Command data includes information indicating the function to execute, information indicating the operations to be made with that function, and user ID indicating the directed other communication terminal 3. The CPU 21 performs the determination in S448 by determining whether or not an input instructing the transmission of command data to another communication terminal 3, has been received from the touch panel 263, for example. When determined to transmit command data (Yes in S448), the CPU 21 transitions the process to S449. On the other hand, when determined not to transmit command data (No in S448), the CPU 21 transitions the process to S452.

The CPU 21 adds data type information to the header of the command data accepted in S448, indicating that it is command data (S449). At this time, the CPU 21 also adds the conference ID and user ID to the header of the command data.

The CPU 21 identifies that the data to be transmitted is command data, based on the data type information included in the header. The CPU 21 then refers the fourth table 244 and identifies the module information and port No. to be used for transmitting command data in the communication direction "outbound" (S450). In the example illustrated in FIG. 6, "3G" is identified as the module information, and "49502" is identified as the port No.

The CPU 21 notifies the OS of an instruction to perform wireless communication using the wireless module of the identified module information, along with the identified port No. and command data (S451). In the example illustrated in FIG. 6, the port No. "49502", the address information of the server 2, and the command data, are transmitted from the conference application to the OS. The CPU 21 which runs the OS controls the wireless module "3G" indicated by the notified port No. so as to transmit the notified command data to the server 2. For example, a TCP header and IP header are added to the packets of the command data by the CPU 21 running the OS, and this command data is transmitted to the server 2. Thus, command data is transmitted from the communication terminal 3 to the server 2.

The CPU 21 determines whether or not to receive the command data (S452). For example, in a case of using a stateless application protocol such as HTTP, the CPU 21 transmits a confirmation request to the server 2 to confirm whether or not there is command data, using any available wireless module. The server 2 transmits whether or not there is any command data intended from the communication terminal 3 that has been transmitted to the server 2 from another communication terminal 3, to the communication terminal 3 as a response to the confirmation request. The CPU 21 performs the determination of S452 based on the response received from the server 2 by any available wireless module. Also, in a case of using a stateful application protocol, the CPU 21 may perform the determination of S452 by determining whether or not a notification, indicating transmission of command data that has been transmitted to the server 2 from another communication terminal 3, has been received from the server 2 by any of the available wireless modules. When determined to receive the command data (Yes in S452), the CPU 21 transitions the process to S453. On the other hand, when determined not to receive the command data (No in S452), the CPU 21 ends the data exchange processing and transitions the process to S43 (see FIG. 7).

The CPU 21 refers the fourth table 244 and identifies the module information and port No. to be used for reception of command data in the communication direction "inbound" (S453). With the example illustrated in FIG. 6, "Wi-Fi" is identified as module information, and "50001" is identified as the port No.

The CPU 21 transmits a command data request requesting the command data transmitted from another communication terminal 3, to the server 2 (S454). The command data request includes conference ID, user ID, and data type information. Note that the command data has been transmitted form another communication terminal 3 to the server 2 by the other communication terminal 3 having performed the above-described S451. The CPU 21 notifies the OS of the instruction to perform wireless communication using the wireless module of the module information identified in S453, for example, along with the identified port No. and command data request. In the example illustrated in FIG. 6, the port No. "50001", the address information of the server 2, and the command data request, are transmitted from the conference application to the OS. The CPU 21 running the OS controls the wireless module "Wi-Fi" indicated by the notified port No. to transmit the notified command data request to the server 2.

The CPU 21 receives the command data from the server 2 in response to the command data request transmitted in S454 (S455). For example, the CPU 21 receives the command data addressed to port No. "50001" from the server 2, via the wireless module "Wi-Fi" used in S454.

The CPU 21 executes processing corresponding to the command data received in S455 (S456) For example, in the event that the received command data is a mute instruction, the CPU 21 transmits an instruction to the input I/F 26, to the effect to not transmit audio data obtained at the microphone 262 to the CPU 21. Also, in the event that the received command data is a layout change instruction, the CPU 21 transmits an instruction to the display portion 271 via the output I/F 27, to the effect that the position of a display image is to be changed to the layout indicated by the command data. After executing S456, the CPU 21 ends the data exchange processing and transitions the process to S43 (see FIG. 7).

The CPU 21 determines whether or not input of an instruction to end the remote conference has received (S43). When determined that input of an instruction to end the remote conference has not received (No in S43), the CPU 21 returns the process to S11. When determined that input of an instruction to end the remote conference has received (Yes in S43), the CPU 21 ends the main processing.

As described above, the communication terminal 3 can switch the port No. (S33) for each data type information of data transmitted to the server 2, in accordance with the corresponding data volume and delay time tolerance, so as to be transmitted with an appropriate wireless module (S403 through S405, S413 through S415, S422 through S424, S431 through S433, S440 through S442, and S449 through S451). Also, the communication terminal 3 can cause data to be transmitted from the server 2 so as to receive data, using the port No. corresponding to the data volume and delay time tolerance corresponding to the data type information (S407 through S409, S417 through S419, S426 through S428, S435 through S437, S444 through S446, and S453 through S455). Accordingly, the communication terminal 3 can perform wireless communication with the server 2 using a port No. appropriate according to the data type information, and using a corresponding wireless module.

The communication terminal 3 can select the port No. so that data of a data type information with high priority (i.e., data type information regarding which short delay time is required) can be communicated over a communication channel with little delay time (S73 through S85). Accordingly, the communication terminal 3 can perform communication of data regarding which short delay time is required (e.g., "audio data" and "video data" data) with short delay time. Also, the communication terminal 3 can transmit data of data type information using one port No., so wireless communication can be performed using the transmission channel capacity of transmission channels efficiently. Note that in this case, the communication terminal 3 operates such that the data amount does not exceed the transmission channel capacity. Accordingly, increase in communication delay and error rate, which may occur when the data amount exceeds the transmission channel capacity, can be suppressed.

Also, when at least one of variation among the bandwidth usage, delay time, and available bandwidth, each obtained at different timings, exceeds a predetermined level, the communication terminal 3 can update the correlation between the data type information and port No. (see FIG. 8). Specifically, when bandwidth usage obtained earlier (second bandwidth usage) is not within a +/−3σ range of bandwidth usage obtained later (first bandwidth usage), in the event that delay time obtained earlier (second delay time) is not within a +/−3σ range of delay time obtained later (first delay time), or in the event that available bandwidth obtained earlier (second available bandwidth) is not within a +/−3σ range of available bandwidth obtained later (first available bandwidth), the correlation between data type information and port No. can be updated. Accordingly, the communication terminal 3 can perform wireless communication using a suitable wireless module for the updated bandwidth usage, delay time, and available bandwidth.

Also, in the event that the second bandwidth usage is within a +/−3σ range of the first bandwidth usage, the second delay time is within a +/−3σ range of the first delay time, and the second available bandwidth is within a +/−3σ range of the first available bandwidth, the communication terminal 3 does not switch the wireless module. Accordingly, the communication terminal 3 can prevent the wireless communication from becoming unstable due to the wireless module being frequently switched.

Also, in the event that the total number of data type information obtained at different timings does not match, the communication terminal 3 can update the correlation between the data type information and port No. (see FIG. 8). Thus, the communication terminal 3 can perform wireless communication using a wireless module appropriate for the total number following the change.

Note that the present disclosure is not limited to the above embodiment, and that various modifications can be made. For example, in the above embodiment, the CPU 21 selects port Nos. in the order of short delay time stored in the first table 241 (S77), and compares the available bandwidth and bandwidth usage (S81) to create the fourth table 244. However, an arrangement may be made where the CPU 21 selects port Nos. in the order of short delay time stored in the first table 241 (S77), and correlates selected port Nos. with any data type information without comparing the available bandwidth and bandwidth usage, to create the fourth table 244. That is, the fourth table 244 may be created based solely on the delay time in first table 241. Also, an arrangement may be made where the CPU 21 selects port Nos. in any order, and compares the available bandwidth and bandwidth usage (S81) to create the fourth table 244. That is to say, the fourth table 244 may be created based solely on the available bandwidth in the first table 241.

Also, in the above embodiment, the CPU 21 identifies transmission channel capacity per unit time as available bandwidth for each transmission channel (S25), identifies data volume per time unit as bandwidth usage for each data type information (S19), and identifies a wireless module to be used for each data type information, based on the average of the available bandwidth and the average of the bandwidth usage that have been identified (S83). However, an arrangement may be made where the CPU 21 identifies the wireless module to be used for each data type information, based on transmission channel capacity per predetermined time (e.g., 10 seconds) and data volume per predetermined time.

Also, in the above embodiment, the priority is associated with the data type information being higher the shorter the delay time permissible of the data type information in a remote conference is, but priority may be set based on a different standard. For example, an arrangement may be made where the CPU 21 sets the priority of data higher for data regarding which accurate communication is required in a remote conference (e.g., "command data"). The CPU 21 may identify the port No. to be used for each data type information such that data regarding which accurate communication is required in a remote conference is given priority to be communicated over a transmission channel with short delay time.

Also, in the above embodiment, the CPU 21 correlating plural types of data type information to a single port No. However, an arrangement may be made where the CPU 21 correlates port Nos. and data type information on a one-to-one basis.

Also, in the above embodiment, when at least one of bandwidth usage, data type information, delay time, and available bandwidth, is obtained at different timings, change according to predetermined conditions, the CPU 21 switches the wireless module (S51, S53, S55, S57, and S61). However, an arrangement may be made where, when all of bandwidth usage, data type information, delay time, and available bandwidth, obtained at different timings, change according to predetermined conditions, the CPU 21 switches the wireless module. Note that the determination conditions are not limited to the examples given in the embodiment.

Also, in the above embodiment, the CPU 21 compares (S81) the bandwidth usage identified in S75 and the available bandwidth identified in S79, and when determined that the bandwidth usage is smaller than the available bandwidth (Yes in S81), the CPU 21 correlates the communication direction, data type information, port No., and module information, and recording (S83) in the fourth table 244 (see FIG. 6). However, an arrangement may be made where, even in the event that the bandwidth usage is equal to or greater than the available bandwidth (No in S81), the CPU 21 correlates the communication direction, data type information, port No., and module information, and stores in the fourth table 244 (see FIG. 6). Also, an arrangement may be made where, even in the event that the bandwidth usage is equal to or greater than the available bandwidth (No in S81), the CPU 21 correlates the data type information regarding which the priority is highest of the data type information stored in the third table 243 with the port No. of which the delay time is the shortest, and stores in the fourth table 244. Accordingly, the CPU 21 can perform wireless communication of data of a data type information of which the permissible delay time is the shortest, using a wireless module identified by a port No. with the shortest delay time.

What is claimed is:

1. A non-transitory computer-readable medium storing computer readable instructions, the instructions, when executed by a processor of a communication terminal, perform processes comprising:
   a first obtaining operation obtaining identification information of plural wireless modules provided in the communication terminal, each of the plural wireless modules communicating according to communication formats different each other;
   a second obtaining operation obtaining at least one of a transmission channel capacity and a delay time for each of the plural wireless modules based on data transmitted and received between a server and the communication terminal via each of the plural wireless modules referenced by each of the identification information obtained by the first obtaining operation;
   a first storing operation storing, in a storage device, the at least one of the transmission channel capacities and the delay time obtained by the second obtaining operation in association with each of the identification information of the plural wireless modules;
   a third obtaining operation obtaining data type information relating to plural types of communication data in a remote conference being communicated between the server and the communication terminal;
   a second storing operation storing, in the storage device, the data type information in association with the identification information based on the at least one of a transmission channel capacity and a delay time associated with the identification information in the storage device;
   a communicating operation communicating with the server using the wireless module referenced by the identification information associated with the data type information based on the data type information and the identification information associated with each other in the storage device; and
   fourth obtaining operation obtaining data volume of the communication data for each of the data type information,
   wherein the second obtaining operation comprises obtaining the delay time for each of the plural wireless modules,
   wherein the first storing operation comprises storing, in the storage device, the delay time obtained by the second obtaining operation in association with each of the identification information of the plural wireless modules, and
   wherein the second storing operation comprises storing, in the storage device, the data type information in association with the identification information based on predetermined priorities of the data type information for a delay time,
   wherein the second storing operation further comprises storing, in the storage device, the data type information having a highest priority in association with the identification information relating to the wireless module having a smallest delay time,
   wherein the second obtaining operation further comprises obtaining the transmission channel capacities for each of the plural wireless modules,
   wherein the first storing operation further comprises storing, in the storage device, the transmission channel capacities obtained by the second obtaining in association with each of the identification information of the plural wireless modules, and
   wherein the second storing operation further comprises:
      first selecting operation selecting data type information with the highest priority;
      second selecting operation selecting identification information of the wireless module corresponding to the wireless module having the smallest delay time;
      first judging operation judging whether data volume of communication data corresponding to the selected data type information is less than transmission channel capacity of the wireless module referenced by the selected identification information; and
      a storing operation storing, in the storage device, the selected data type information in association with the selected identification information in response to a judgment of the first judging operation that the data volume is less than the transmission channel capacity,
   further comprising a second judging operation judging whether variation of first data volume of first communication data with respect to a second data volume of second communication data is greater than a predetermined threshold based on a comparison of the first communication data with the second communication data, the first data volume being obtained by the fourth obtaining operation, and the second data volume being obtained by the fourth obtaining operation prior to the first data volume,
   wherein the second storing operation further comprises storing, in the storage device, the data type information in association with the identification information in response to a judgment of the second judging operation that the variation of the first data volume is greater than the predetermined threshold.

2. The non-transitory computer-readable medium according to claim 1,
   wherein the communicating comprises:
      a third judging operation judging whether to transmit transmission data to be transmitted to the server, the transmission data corresponding to specific data type information;
      a first determining operation determining, in response to the first judging operation to transmit the transmission data, the identification information relating to the specific data type information based on the data type information and the identification information associated with each other in the storage device; and
      a first transmitting operation transmitting the transmission data to the server using the wireless module that is referenced by the identification information determined by the first determining operation.

3. The non-transitory computer-readable medium according to claim 1,
   wherein the third obtaining operation comprises obtaining the data type information including at least a first data type information corresponding to audio data, and
   wherein the second storing operation further comprises storing, in the storage device, the first data type information in association with identification information relating to the wireless module having the smallest delay time.

4. The non-transitory computer-readable medium according to claim 1, further comprises:
a third judging operation judging whether a first number of data type information is different from a second number of data type information, the first number is obtained by the third obtaining operation, and the second number is obtained by the third obtaining operation prior to the second obtaining,
wherein the second storing operation further comprises storing, in the storage device, the data type information in association with the identification information in response to a judgment of the third judging operation that the first number is different from the second number.

5. The non-transitory computer-readable medium according to claim 1, further comprises:
a third judging operation judging whether variation of a first transmission channel capacity with respect to a second transmission channel capacity is greater than a predetermined threshold, the first transmission channel capacity being obtained by the second obtaining operation, and the second transmission channel capacity being obtained by the second obtaining operation prior to the first obtaining,
wherein the second storing operation further comprises storing, in the storage device, the data type information in association with the identification information in response to a judgment of the third judging operation that the variation of the first transmission channel capacity is greater than the predetermined threshold.

6. The non-transitory computer-readable medium according to claim 1, further comprises:
a third judging operation judging whether variation of a first delay time with respect to a second delay time is greater than a predetermined threshold, the first delay time being obtained by the second obtaining operation, and the second delay time being obtained by the second obtaining operation prior to the first obtaining,
wherein the second storing operation further comprises storing, in the storage device, the data type information in association with the identification information in response to a judgment of the third judging operation that the variation of the first delay time is greater than the predetermined threshold.

7. The non-transitory computer-readable medium according to claim 1, wherein the second storing operation further comprises:
a third storing operation storing, in the storage device, a first data type information in association with a first identification information based on the plural at least one of a transmission channel capacity and a delay time associated with the identification information in the storage device, the first identification information being one of the identification information;
a fourth storing operation storing, in the storage device, a second data type information in association with a second identification information based on the plural at least one of a transmission channel capacity and a delay time associated with the identification information in the storage device, the second identification information being another of the identification information being different from the first identification information, and
wherein the communicating operation further comprises:
a first communicating operation communicating first communication data with the server using a first wireless module referenced by the first identification based on the first data type information and the first identification information associated with each other in the storage device; and
a second communicating operation communicating second communication data with the server using the wireless module referenced by the second identification based on the second data type information and the second identification information associated with each other in the storage device.

8. A non-transitory computer-readable medium storing computer readable instructions, the instructions, when executed by a processor of a communication terminal, perform processes comprising:
a first obtaining operation obtaining identification information of plural wireless modules provided in the communication terminal, each of the plural wireless modules communicating according to communication formats different each other;
a second obtaining operation obtaining at least one of a transmission channel capacity and a delay time for each of the plural wireless modules based on data transmitted and received between a server and the communication terminal via each of the plural wireless modules referenced by each of the identification information obtained by the first obtaining operation;
a first storing operation storing, in a storage device, the at least one of the transmission channel capacities and the delay time obtained by the second obtaining operation in association with each of the identification information of the plural wireless modules;
a third obtaining operation obtaining data type information relating to plural types of communication data in a remote conference being communicated between the server and the communication terminal;
a second storing operation storing, in the storage device, the data type information in association with the identification information based on the at least one of a transmission channel capacity and a delay time associated with the identification information in the storage device; and
a communicating operation communicating with the server using the wireless module referenced by the identification information associated with the data type information based on the data type information and the identification information associated with each other in the storage device,
wherein the communicating comprises:
a first judging operation judging whether to transmit transmission data to be transmitted to the server, the transmission data corresponding to specific data type information;
a first determining operation determining, in response to the first judging operation to transmit the transmission data, the identification information relating to the specific data type information based on the data type information and the identification information associated with each other in the storage device; and
a first transmitting operation transmitting the transmission data to the server using the wireless module that is referenced by the identification information determined by the first determining operation, and
wherein the communicating further comprises:
a second judging operation judging whether to receive reception data to be received from the server, the reception data corresponding to the specific data type information;

a second determining operation judging, in response to the second judging operation to receive the reception data, the identification information relating to the specific data type information based on the data type information and the identification information associated with each other in the storage device;

a second transmitting operation transmitting a request to the server using the wireless module that is referenced by the identification information determined by the second determining operation, the request including the data type information of the reception data; and a first receiving operation receiving the reception data from the server in response to the second transmitting operation.

9. A communication terminal comprising:
a processor; and
a memory storing computer readable instructions, the instructions, when executed by the processor, perform processes comprising:
  a first obtaining operation obtaining identification information of plural wireless modules provided in the communication terminal, each of the plural wireless modules communicating according to communication formats different each other;
  a second obtaining operation obtaining at least one of a transmission channel capacity and a delay time for each of the plural wireless modules based on data transmitted and received between a server and the communication terminal via each of the plural wireless modules referenced by each of the identification information obtained by the first obtaining;
  a first storing operation storing, in a storage device, the at least one of the transmission channel capacities and the delay time obtained by the second obtaining operation in association with each of the identification information of the plural wireless modules;
  a third obtaining operation obtaining data type information relating to plural types of communication data in a remote conference being communicated between the server and the communication terminal;
  a second storing operation storing, in the storage device, the data type information in association with the identification information based on the at least one of a transmission channel capacity and a delay time associated with the identification information in the storage device; and
  a communicating operation communicating with the server using the wireless module referenced by the identification information associated with the data type information based on the data type information and the identification information associated with each other in the storage device,
wherein the communicating comprises:
  a first judging operation judging whether to transmit transmission data to be transmitted to the server, the transmission data corresponding to specific data type information;
  a first determining operation determining, in response to the first judging operation to transmit the transmission data, the identification information relating to the specific data type information based on the data type information and the identification information associated with each other in the storage device;
  a first transmitting operation transmitting the transmission data to the server using the wireless module that is referenced by the identification information determined by the first determining operation;

a second judging operation judging whether to receive reception data to be received from the server, the reception data corresponding to the specific data type information;
  a second determining operation judging, in response to the second judging operation to receive the reception data, the identification information relating to the specific data type information based on the data type information and the identification information associated with each other in the storage device;
  a second transmitting operation transmitting a request to the server using the wireless module that is referenced by the identification information determined by the second determining operation, the request including the data type information of the reception data; and
  a first receiving operation receiving the reception data from the server in response to the second transmitting operation.

10. A non-transitory computer-readable medium storing computer readable instructions, the instructions, when executed by a processor of a communication terminal, perform processes comprising:
  storing, in a storage device, each of identification information of plural wireless modules in association with at least one of transmission channel capacities and delay time for each of the plural wireless modules based on data transmitted and received between a server and the communication terminal via each of the plural wireless modules referenced by each of the identification information, the plural wireless modules provided in the communication terminal, each of the plural wireless modules communicating according to communication formats different each other;
  storing, in the storage device, the identification information based on the at least one of a transmission channel capacity and a delay time associated with the identification information in the storage device in association with data type information relating to plural types of communication data in a remote conference being communicated between the server and the communication terminal; and
  communicating with the server using the wireless module referenced by the identification information associated with the data type information based on the data type information and the identification information associated with each other in the storage device,
wherein the communicating comprises:
  first judging whether to transmit transmission data to be transmitted to the server, the transmission data corresponding to specific data type information;
  first determining, in response to the first judging to transmit the transmission data, the identification information relating to the specific data type information based on the data type information and the identification information associated with each other in the storage device; and
  first transmitting the transmission data to the server using the wireless module that is referenced by the identification information determined by the first determining;
  second judging whether to receive reception data to be received from the server, the reception data corresponding to the specific data type information;
  second determining that judges, in response to the second judging to receive the reception data, the identification information relating to the specific data type information based on the data type information and the identification information associated with each other in the storage device;

second transmitting a request to the server using the wireless module that is referenced by the identification information determined by the second determining, the request including the data type information of the reception data; and a first receiving the reception data from the server in response to the second transmitting.

* * * * *